United States Patent [19]
Ishida

[11] Patent Number: 6,009,964
[45] Date of Patent: Jan. 4, 2000

[54] MOTOR-DRIVEN VEHICLE

[75] Inventor: Yoshinobu Ishida, Kobe, Japan

[73] Assignee: Nabco, Limited, Kobe, Japan

[21] Appl. No.: 08/976,318

[22] Filed: Nov. 21, 1997

[30] Foreign Application Priority Data

Nov. 21, 1996 [JP] Japan ................................. 8-327764
May 27, 1997 [JP] Japan ................................. 9-154562

[51] Int. Cl.$^7$ ................................. B62D 11/00
[52] U.S. Cl. ................................. 180/6.5; 180/65.8; 701/42
[58] Field of Search ................................. 180/6.2, 6.48, 180/6.5, 19.1, 19.3, 54.1, 65.1, 65.8, 907; 701/41, 42, 43

[56] References Cited

U.S. PATENT DOCUMENTS

| | | |
|---|---|---|
| 2,937,706 | 5/1960 | Chandler . |
| 3,225,853 | 12/1965 | Norton et al. . |
| 3,477,536 | 11/1969 | Carini . |
| 3,712,399 | 1/1973 | Ruffle et al. . |
| 3,814,199 | 6/1974 | Jones . |
| 3,896,892 | 7/1975 | Kohls et al. . |
| 4,169,513 | 10/1979 | Sagaser et al. ............ 180/271 |
| 4,281,734 | 8/1981 | Johnston . |
| 4,511,825 | 4/1985 | Klimo ................................. 318/67 |
| 4,979,582 | 12/1990 | Forster . |
| 5,103,125 | 4/1992 | Ogden . |
| 5,137,100 | 8/1992 | Scott et al. ............ 180/6.48 |
| 5,246,082 | 9/1993 | Alber . |
| 5,253,724 | 10/1993 | Prior ................................. 180/6.5 |
| 5,366,037 | 11/1994 | Richey . |
| 5,406,674 | 4/1995 | Lawter et al. . |
| 5,409,074 | 4/1995 | Wilson et al. . |
| 5,427,193 | 6/1995 | Avakian . |
| 5,504,971 | 4/1996 | McCormick . |
| 5,529,134 | 6/1996 | Yomogita ................................. 180/6.2 |
| 5,560,204 | 10/1996 | Ishihama et al. ............ 60/426 |
| 5,732,786 | 3/1998 | Fujigaki . |
| 5,771,988 | 6/1998 | Kikutani et al. ............ 180/65.5 |
| 5,818,189 | 10/1998 | Uchiyama et al. ............ 318/488 |

FOREIGN PATENT DOCUMENTS

| | | |
|---|---|---|
| 0061875 | 10/1982 | European Pat. Off. . |
| 9311075 | 11/1994 | Germany . |
| 1-172826 | 12/1989 | Japan . |
| 3-15468 | 1/1991 | Japan . |
| 4-143123 | 5/1992 | Japan . |
| 2224984 | 5/1990 | United Kingdom . |
| 2269145 | 2/1994 | United Kingdom . |
| 2279923 | 1/1995 | United Kingdom . |

OTHER PUBLICATIONS

Abel et al., "An evaluation of different designs of providing powered propulsion for attendant propelled wheelchairs," *Annual International Conferenc of the IEEE Engineering in Medicine and Biology Society*, vol. 13, No. 4, 1991, pp. 1863–1864.

*Primary Examiner*—Daniel G. DePumpo
*Assistant Examiner*—David R. Dunn
*Attorney, Agent, or Firm*—Banner & Witcoff, Ltd.

[57] ABSTRACT

Motors drive drive wheels of a motor-driven vehicle. A manual-driving-force sensing unit senses manual driving forces for driving the drive wheels and develops manual-driving-force representative signals. A control unit computes, from the manual-driving-force representative signals, preliminary motor driving signals which, when applied to the respective motors, would make the motors produce mechanical driving forces. The control unit also computes, from the preliminary motor driving signals, compensate motor driving signals to be applied to the respective motors, when the direction of rotation of the motors are the same. Each of the compensated motor driving signals is prepared from the corresponding one of the preliminary motor driving signal with the other of the preliminary motor driving signals taken into account.

28 Claims, 16 Drawing Sheets

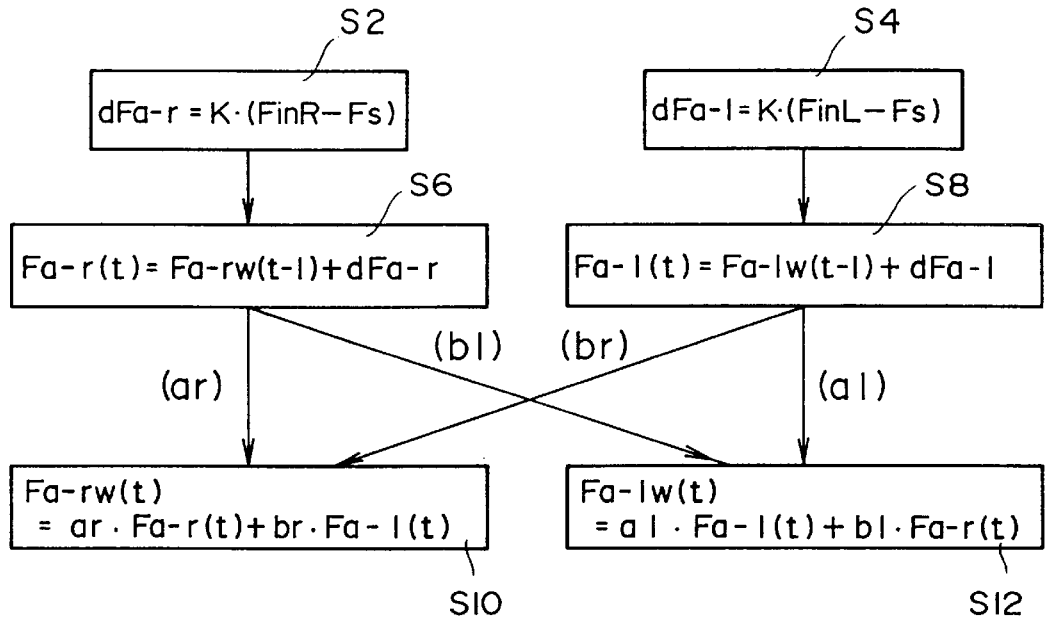
F I G. 1A
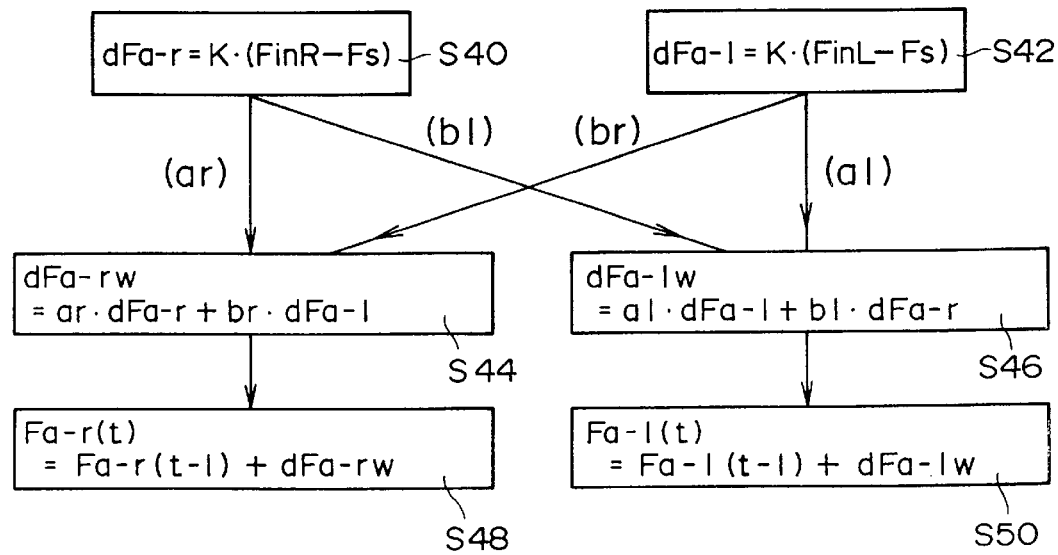
F I G. 1B

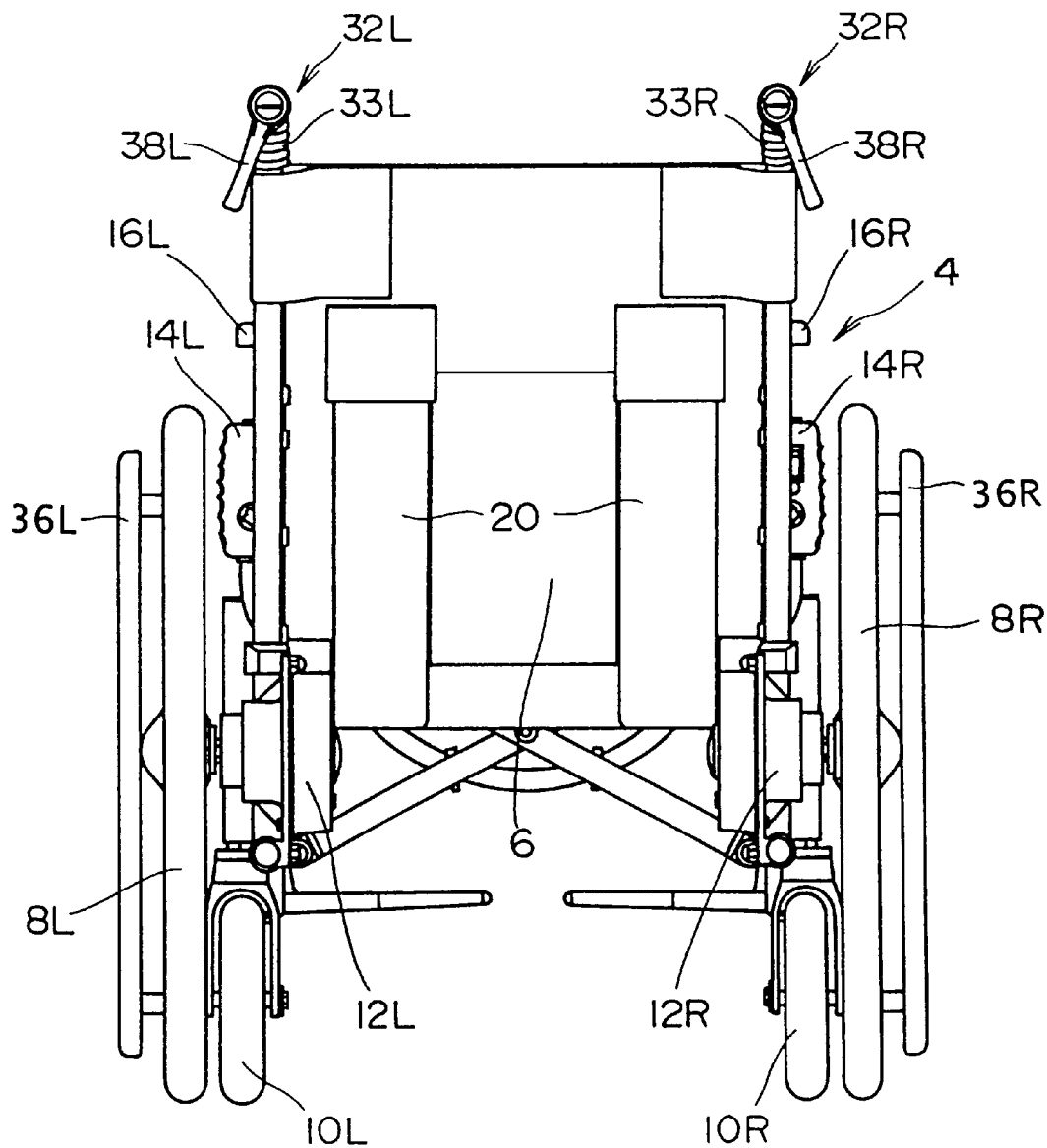
F I G . 3

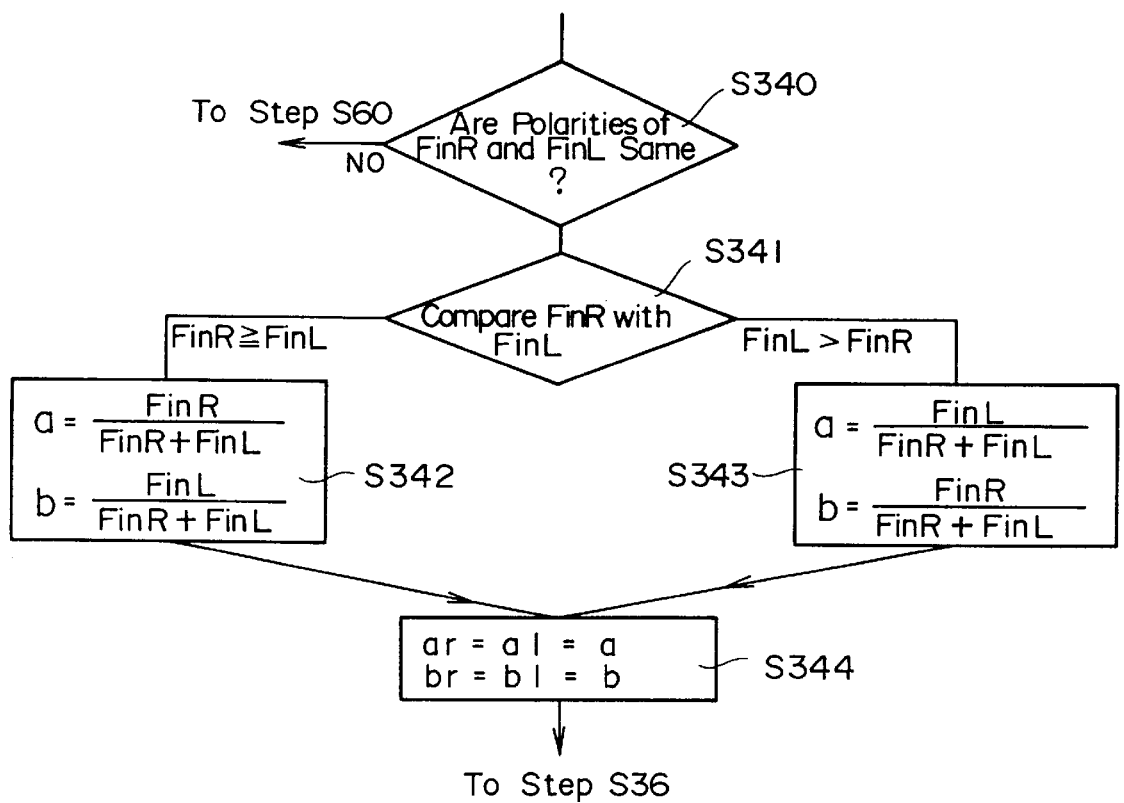
F I G . 12

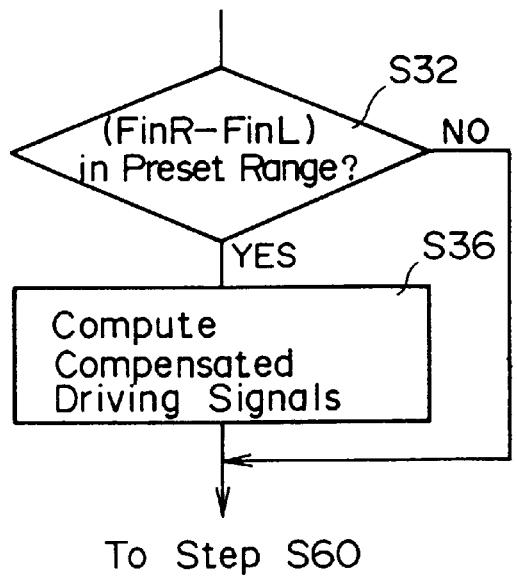
F I G . 14
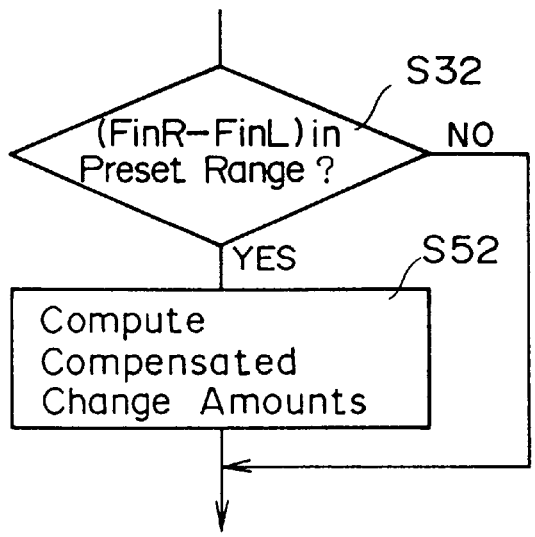
F I G . 18

| L \ R | C1 | | | | | C3− | | | | | C3+ | | | | | C2 | | | | |
|---|---|---|---|---|---|---|---|---|---|---|---|---|---|---|---|---|---|---|---|---|
| | 1:1 | ar | br | al | bl | 3:2 | ar | br | al | bl | 0.6:0 | ar | br | al | bl | 1:0 | ar | br | al | bl |
| C1 | | 0.5 | 0.5 | 0.5 | 0.5 | | 0.6 | 0.4 | 0.6 | 0.4 | | 0.6 | 0 | 0.6 | 0 | | 1.0 | 0 | 1.0 | 0 |
| | 3:2 | ar | br | al | bl | 1:1 | ar | br | al | bl | --- | ar | br | al | bl | 4:1 | ar | br | al | bl |
| C3− | | 0.6 | 0.4 | 0.6 | 0.4 | | 0.5 | 0.5 | 0.5 | 0.5 | | 1.0 | 0 | 0.5 | 0.5 | | 0.8 | 0.2 | 0.8 | 0.2 |
| | 0.6:0 | ar | br | al | bl | --- | ar | br | al | bl | 1:1 | ar | br | al | bl | 3:2 | ar | br | al | bl |
| C3+ | | 0.6 | 0 | 0.6 | 0 | | 0 | 0.5 | 1.0 | 0 | | 0.5 | 0.5 | 0.5 | 0.5 | | 0.6 | 0.4 | 0.6 | 0.4 |
| | 1:0 | ar | br | al | bl | 4:1 | ar | br | al | bl | 3:2 | ar | br | al | bl | 1:1 | ar | br | al | bl |
| C2 | | 1.0 | 0 | 1.0 | 0 | | 0.8 | 0.2 | 0.8 | 0.2 | | 0.6 | 0.4 | 0.6 | 0.4 | | 0.5 | 0.5 | 0.5 | 0.5 |

FIG. 15

MOTOR-DRIVEN VEHICLE

This application is based on Japanese Patent Application No. HEI 8-327764 filed on Nov. 21, 1996 and Japanese Patent Application No. HEI 9-154562 filed on May 27, 1997 with Japanese domestic priority claimed from the former Japanese patent application, which are incorporated hereinto by reference.

The present invention relates to a motor-driven vehicle, e.g. a motor-driven wheelchair, and more particularly to control of motors of such a vehicle for providing assisting power.

BACKGROUND OF INVENTION

A motor-driven vehicle, e.g. a motor-driven wheelchair, includes two drive wheels which are mounted on a vehicle body on its opposite sides and are driven by electric motors coupled to them. The motors drive the respective drive wheels with driving forces determined according to manual-driving-forces exerted by a person who drives the wheelchair which are detected by manual-driving-force sensing units mounted on the wheelchair.

For example, Japanese Unexamined Patent Publication (KOKAI) No. HEI 7-75219 (of which content is disclosed in U.S. patent application Ser. No. 08/798,804, which is a division of U.S. patent application Ser. No. 08/477,039 filed on Jun. 7, 1995 and now abandoned) discloses a motor-driven wheelchair which includes two manual-driving-force sensing units mounted on the wheelchair body for each of motors providing assisting force. Manual driving forces exerted to the respective manual-driving-force sensing units drive the associated drive wheels. At the same time, the respective manual-driving-force sensing units detect the magnitudes of the manual-driving-forces applied to them, and the motors drive the associated drive wheels with force determined according to the detected manual driving forces. According to the invention disclosed in this Japanese unexamined patent publication, the two drive wheels are independently controlled.

Since manual driving forces are exerted to the vehicle body by a human, e.g. an attendant to the person who is on the wheelchair, or the person on the wheelchair himself, the times at which the manual driving forces are applied to the respective manual-driving-force sensing units may differ, or, sometimes, the magnitudes of the manual driving forces applied to the respective manual-driving-force sensing units may differ because of difference in muscular strength between his right and left arms. In the motor-driven wheelchair disclosed in the above-cited Japanese unexamined publication, the two drive wheels are independently controlled by their associated motors in relation to the manual driving forces as detected by the manual-driving-force sensing units for the respective drive wheels. Accordingly, difference in timing of application of manual driving forces or difference in magnitude of manual driving forces as described above may cause motor forces to be applied to the respective drive wheels at different times, or may cause different magnitudes of motor force to be applied to the drive wheels. Therefore, it is difficult to drive the wheelchair straight.

In order to drive the wheelchair straight, the attendant or the person on the wheelchair must endeavor to properly control the timing of application of manual driving forces or the magnitudes of the manual driving forces. Then it is more or less difficult to drive such wheelchair in a desired manner.

Accordingly, an object of the present invention is to provide a motor-driven vehicle which can be driven straight despite difference in timing of application or difference in magnitude of manual driving forces, and which is easy to drive.

A motor-driven vehicle need be also driven to rotate clockwise or counterclockwise. The fact that the vehicle can be driven straight despite difference in timing of application or in magnitude of manual driving forces may pose a problem when the vehicle should be rotated.

Accordingly, another object of the present invention is to provide a motor-driven vehicle which can be driven straight despite difference in timing of application or in magnitude of manual driving forces, and which is easy to drive, and which also can be easily rotated clockwise or counterclockwise when necessary.

SUMMARY OF THE INVENTION

The above described objects may be achieved by the inventions described below and claimed in the appended claims.

According to the invention of claim 1, a motor-driven vehicle includes a vehicle body on which a human can sit. First and second drive wheels are mounted on opposite sides of the vehicle body. A first motor drives the first drive wheel, and a second motor drives the second drive wheel. The first and second motors may be mounted on the vehicle body or may be disposed in a space defined in the respective drive wheels. First manual-driving-force sensing means senses a first manual driving force applied to rotate the first drive wheel, and second manual-driving-force sensing means senses a second manual driving force applied to rotate the second drive wheel. The first and second manual-driving-force sensing means may be mounted on the vehicle body or may be mounted on hand rims associated with the respective ones of the first and second drive wheels. Control means is provided for computing from the sensed first and second manual driving forces first and second signals for the respective first and second motors. The first and second signals, when applied to the first and second motors, could cause them to produce mechanical driving forces F1 and F2 to be applied to the first and second drive wheels. Hereinafter, the first and second signals are referred to as first and second preliminary motor driving signals F1 and F2. Thus, in the specification, "F1" and "F2" represent mechanical forces which the first and second motors would provide in response to the first and second preliminary motor driving signals in some portions, and also represent the first and second preliminary motor driving signals themselves in other portions.

The control means includes compensated mechanical driving force computing means for computing from the first and second preliminary motor driving signals F1 and F2, a first compensated-driving-force representative signal which, when applied to the first motor, causes the first motor to provide a first compensated mechanical driving force FC1 to be applied to the first drive wheel, and a second compensated-driving-force representative signal which, when applied to the second motor, causes the second motor to provide a second compensated mechanical driving force FC2 to be applied to the second drive wheel. The first and second compensated-driving-force representative signals are hereinafter referred to as first compensated motor driving signal FC1 and second compensated motor driving signal FC2, respectively. Thus, in this specification, "FC1" and "FC2" represent the first and second compensated mechanical driving forces which the first and second motors actually provide in response to the first and second compensated motor driving signals in some portions and, in other portions, "FC1" and "FC2" denote the first and second compensated signals themselves.

The first compensated motor driving signal FC1 is equal to the sum of the first and second preliminary motor driving signals F1 and F2 multiplied by predetermined compensation factors ar and br, respectively, i.e. the sum of F1·ar and F2·br, whereas the second compensated motor driving signal FC2 is equal to the sum of the second and first preliminary motor driving signals F2 and F1 multiplied by predetermined compensation factors al and bl, respectively, i.e. the sum of F2·al and F1·bl.

According to the invention of claim 1, the first compensated motor driving signal FC1 is calculated by an expression, ar·F1+br·F2, and the second compensated motor driving signal FC2 is calculated by an expression, al·F2+bl·F1. Like this, the first motor is not driven in response to the first preliminary motor driving signal F1 alone, but it is also driven with the second preliminary motor driving signal F2 related to the second motor taken into account, and the second motor is not driven in response to the second preliminary motor driving signal F2 alone, but it is also driven with the first preliminary motor driving signal F1 related to the first motor taken into account. Accordingly, even when the first and second manual driving forces on the basis of which the first and second preliminary motor driving signals F1 and F2 are produced are not equal to each other, the first and second compensated motor driving signals FC1 and FC2 which actually drive the first and second motors are not only prepared from the preliminary motor driving signals F1, F2 associated therewith but also related to the preliminary motor driving signals F2, F1 associated with the other motors. In addition, even when the first preliminary motor driving signal F1, for example, has not yet been developed, with the second preliminary motor driving signal F2 having been developed already, the both compensated motor driving signals FC1 and FC2 can be developed simultaneously and synchronously. Thus, imbalance between the compensated driving forces FC1 and FC2 can be reduced, which enables the vehicle to be driven straight. Since the motor-driven vehicle according to claim 1 is easily driven straight despite imbalance in timing of application or in magnitude of manual driving forces, there is no need for attendants or vehicle users to spare extra time to learn how to drive the vehicle.

According to the invention of claim 2, the control means includes means for activating the compensated driving force computing means only when the control means judges that the directions in which the first and second motors rotates the same.

According to the invention of claim 2, the compensated driving forces are computed only when the directions in which the first and second motors rotates are the same, e.g. when the motor-driven vehicle is driven straight forward. Different directions of rotation of the first and second motors indicates that the vehicle is being rotated. In such a case, if the compensated driving forces are balanced, the vehicle cannot be rotated.

According to the invention of claim 2, only when the vehicle is driven straight, the compensated driving forces are computed such that balanced driving forces are provided for the drive wheels, and, therefore, the driving of the motor-driven vehicle is easy and stable.

According to the invention of claim 3, the compensation factor ar for the first preliminary motor driving signal F1 forming a part of the first compensated motor driving signal FC1 in the vehicle of claim 2 is equal to or larger than the compensation factor br for the second preliminary motor driving signal F2, i.e. ar≧br, whereas the compensation factor al for the second preliminary motor driving signal F2 forming a part of the second compensated motor driving signal FC2 is equal to or larger than the compensation factor bl for the first preliminary motor driving signal F1, i.e. al≧bl.

According to the invention of claim 3, the influence of the first manual driving force on the first compensated driving force FC1 is equal to or larger than that of the second manual driving force, and the influence of the second manual driving force on the second compensated driving force FC2 is equal to or larger than that of the first manual driving force. Thus, the compensated driving forces FC1 and FC2 are synchronously provided. In addition, even when the directions of rotation of the first and second motors are the same, if different magnitudes of first and second manual driving forces are applied to the vehicle in order to turn it, the vehicle is easily turned. Thus, the controllability of the motor-driven vehicle is improved.

According to the invention of claim 4, in the vehicle of claim 3, the sum of the compensation factor ar for the first preliminary motor driving signal F1 forming a part of the first compensated motor driving signal FC1 and the compensation factor br for the second preliminary motor driving signal F2 is equal to the sum of the compensation factor al for the second preliminary motor driving signal F2 forming a part of the second compensated motor driving signal FC2 and the compensation factor bl for the first preliminary motor driving signal F1. It can be expressed as ar+br=al+bl.

If ar+br=C and al+bl=2C, FC1 would vary within a range of from C·F1 to C/2(F1+F2), while FC2 would vary within a range of from 2C·F2 to C(F1+F2), because ar≧br and al≧bl. Thus, FC1 and FC2 are not equal. However, according to claim 4, ar+br=al+bl, and, therefore, FC1 varies between C·F1 and C/2(F1C·+F2) and FC2 varies between C.F2 and C/2(F1+F2). Thus, in comparison with a case where the sums are different, FC1 and FC2 become equal to or approximate to each other, which means the vehicle has an improved controllability.

According to the invention of claim 5, in the vehicle of claim 4, the compensation factor ar for the first preliminary motor driving signal F1 forming a part of the first compensated motor driving signal FC1 is equal to the compensation factor al for the second preliminary motor driving signal F2 forming a part of the second compensated motor driving signal FC2, and the compensation factor br for the second preliminary motor driving signal F2 forming a part of the first compensated motor driving signal FC1 is equal to the compensation factor bl for the first preliminary motor driving signal F1 forming a part of the second compensated motor driving signal FC2.

In other words, ar=al and br=bl. When ar=al is represented by a and br=bl is represented by b, there are various relationships between a and b: a is considerably larger than b, a is slightly larger than b, a and b are equal, and so forth.

According to the invention of claim 5, the first compensated motor driving signal FC1 is equal to aF1+bF2, and the second compensated motor driving signal FC2 is equal to aF2+bF1. Accordingly, the proportion of the first preliminary motor driving signal F1 in the first compensated motor driving signal FC1 and the proportion of the second preliminary motor driving signal F2 in the second compensated motor driving signal FC2 can be set equal, and the proportion of the second preliminary motor driving signal F2 in the first compensated motor driving signal FC1 and the proportion of the first preliminary motor driving signal F1 in the second compensated motor driving signal FC2 can be set equal. Accordingly, a change which may be caused in the first and second compensated motor driving signals by a change in a manual driving force relating to one of the preliminary motor driving signals is equal to a change which may be caused in the second and first compensated motor driving signals by a change in a manual driving force relating to the other of the preliminary motor driving signals. Thus, the vehicle is easy to control.

According to the invention of claim 6, the motor-driven vehicle of claim 4 is provided with compensation factor computing means for computing the factors ar, br, al and bl for the first and second preliminary motor driving signals forming a part of the respective ones of the first and second compensated motor driving signals FC1 and FC2, according to the ratio between the first and second manual driving forces.

Since the compensation factors ar, al, br and bl vary with the ratio between the first and second manual driving forces, It is easy both to drive the vehicle straight and to turn or rotate the vehicle. For example, let it be assumed that ar and al are large and br and bl are small, which are determined according to the ratio between the first and second manual driving forces. When the difference between the first and second manual driving forces is large, the compensation factors ar and al are larger and br and bl are smaller. In this case, the influence of the first preliminary motor driving signal F1 on the first compensated motor driving signal FC1 is larger, and the influence of the second preliminary motor driving signal F2 on the second compensated motor driving signal FC2 is larger. A large difference between the first and second manual driving forces often means that the vehicle is being turned or rotated with the first and second motors driven in the same direction. Thus, by determining the respective compensation factors in relation to the manual driving forces, the vehicle is assisted in turning or rotation.

When the difference between the first and second manual driving forces is small, the values of ar and al are close to each other and the values of br and bl are also close to each other. Accordingly, the influences of the first and second preliminary motor driving signals F1 and F2 on the first compensated motor driving signal FC1 is small, and the influence of the first and second preliminary motor driving signals F1 and F2 on the second compensated motor driving signal FC2 is also small. A small difference between the first and second manual driving forces frequently means that the vehicle is being driven straight. Thus, by determining the respective compensation factors in relation to the manual driving forces, the vehicle is assisted in moving straight.

According to the invention of claim 7, the compensated driving force computing means of the motor-driven vehicle according to claim 4 computes the first and second compensated motor driving signals when the difference between the first and second manual driving forces Is within a preset range.

According to the invention of claim 7, when the difference between the first and second manual driving forces is within a preset range, which means that such difference is small, it is considered that the vehicle is being moved straight. Then, the compensated driving force computing means computes FC1 by the expression, $ar \cdot F1 + br \cdot F2$, and FC2 by the expression, $al \cdot F2 + bl \cdot F1$, whereby the first and second compensated motor driving signals FC1 and FC2 have values closer to each other. This prevents staggering of the vehicle.

When the difference is out of the preset range, which means that the difference is large, it is considered that the vehicle is being turned or rotated. In such a case, the compensated driving force computing means do not compute the first and second compensated motor driving signals, but the first and second preliminary motor driving signals F1 and F2 are used as the first and second compensated motor driving signals FC1 and FC2, so that the turning or rotation of the vehicle is easier.

According to the invention of claim 8, the motor-driven vehicle according to claim 3 is provided with input means for entering the respective compensation factors in the compensated driving force computing means. The input means enables setting any desired values for the compensation factors ar, br, al and bl in the compensated driving force computing means. Thus, a person who drives the vehicle can choose compensation factors ar, br, al and bl which are suitable for him or her to drive the vehicle as he or she desires.

According to the invention of claim 9, the control means of the motor-driven vehicle of claim 2 includes a compensation table. The compensation table contains a plurality of compensation regions which are defined by a desired number of threshold values set for values of the first and second manual driving forces. The compensation table is used to determine the respective compensation factors ar, br, al and bl in accordance with the combination of compensation regions to which the first and second manual driving forces belong.

The first and second manual driving forces may have various magnitudes. Such magnitudes of the manual driving forces represent the manner in which the driver intends to drive the vehicle. According to the invention of claim 9, the driver's intention is judged by determining the compensation regions to which the first and second manual driving forces belong, and the compensation factors suitable for the driver's intention are selected.

According to the invention of claim 10, the respective compensation factors as defined in claim 9 are within a range of from 0 to 1 both inclusive.

According to claim 10, all of the compensation factors ar, br, al and bl are between 0 and 1 inclusive. Accordingly, the first and second compensated motor driving signals FC1 and FC2 are within the range of the first and second preliminary motor driving signals F1 and F2.

According to the invention of claim 11, the compensation table of claim 10 is arranged such that when the compensation regions in which the first and second manual driving forces fall are spaced from each other, the compensation factor ar for the first preliminary motor driving signal F1 forming part of the first compensated motor driving signal FC1 is chosen to be larger than the compensation factor br for the second preliminary motor driving signal F2 forming part of the first compensated motor driving signal FC1 and the compensation factor al for the second preliminary motor driving signal F2 forming part of the second compensated motor driving signal FC2 is chosen to be larger than the compensation factor bl for the first preliminary motor driving signal F1 forming part of the second compensated motor driving signal FC2, by a degree depending on the distance between the region of the first manual driving force and the region of the second manual driving force.

A large distance between the regions in which the first and second manual driving forces fall indicates that the difference between the manual driving forces is large, and, which, in turn, may mean that although the two driving motors are to be rotated in the same direction, the vehicle is to be turned or rotated. According to claim 11, in order to make it easier to turn or rotate the vehicle, the proportion of the first preliminary motor driving signal F1 in the first compensated motor driving signal FC1 and the proportion of the second preliminary motor driving signal F2 in the second compensated motor driving signal FC2 is made larger.

According to the invention of claim 12, the compensation table of claim 10 is arranged such that the same value is used for the compensation factors ar, br, al and bl when the regions in which the first and second manual driving forces fall are the same.

The fact that the regions in which the first and second manual driving forces fall are the same means that the difference between the first and second manual driving forces is not large, which likely, indicates that the vehicle is being driven straight. According to claim 12, in order to ensure that the vehicle is driven straight, the same value, γ, is employed for ar, al, br and bl so that FC1 and FC2 are equal to the same value, γ (F1+F2).

Like the motor-driven vehicle of claim 1, a motor-driven vehicle according to claim 13 includes a vehicle body on which a human may sit. First and second drive wheels are mounted on opposite sides of the vehicle body. A first motor drives the first drive wheel, and a second motor drives the second drive wheel. The first and second motors may be mounted on the vehicle body or may be disposed in a space defined in the respective drive wheels. First manual-driving-force sensing means senses a first manual driving force applied to rotate the first drive wheel, and second manual-driving-force sensing means senses a second manual driving force applied to rotate the second drive wheel. The first and second manual-driving-force sensing means may be mounted on the vehicle body or may be mounted on hand rims associated with the respective ones of the first and second drive wheels.

In addition, the vehicle of claim 13 includes control means which controls the first and second motors. The control means computes from the sensed first and second manual driving forces first and second preliminary motor driving signals F1 and F2 for the first and second motors. The first and second preliminary motor driving signals F1 and F2, as in the invention of claim 1, when applied to the first and second motors, could cause them to provide forces F1 and F2 to be applied to the first and second drive wheels.

The control means includes compensated driving force computing means for computing from the first and second preliminary motor driving signals F1 and F2, a first compensated motor driving signal FC1 which, when applied to the first motor, causes the first motor to provide a first compensated driving force FC1 to be applied to the first drive wheel, and a second compensated motor driving signal FC2 which, when applied to the second motor, causes the second motor to provide a second compensated driving force FC2 to be applied to the second drive wheel. The first and second compensated motor driving signals FC1 and FC2 are similar to the ones explained with respect to the invention of claim 1.

The first compensated motor driving signal FC1 is computed from the first preliminary motor driving signal F1 by modifying it by the second preliminary motor driving signal FC2, and the second compensated motor driving signal FC2 is computed from the second preliminary motor driving signal F2 by modifying it by the first preliminary motor driving signal F1.

According to claim 13, the first motor is not only driven with the first preliminary motor driving signal F1, but also partly with the second preliminary motor driving signal F2. Also, the second motor is not only driven with the second preliminary motor driving signal F2, but also partly with the first preliminary motor driving signal F1. Accordingly, even when the first and second manual driving forces from which the first and second preliminary motor driving signals F1 and F2 are prepared are not equal to each other, the resulting first and second compensated motor driving signals FC1 and FC2 have been partly influenced by the second and first preliminary motor driving signals F2 and F1, respectively. In the most extreme case, before the first preliminary motor driving signal F1, for example, is produced, the second preliminary motor driving signal F2 has been already produced. Even in such a case, however, the signal F2 can produce both of the compensated motor driving signals FC1 and FC2 simultaneously. Thus, according to this arrangement, the first and second compensated motor driving signals FC1 and FC2 are synchronously developed and imbalance between them can be reduced, so that the vehicle can be easily driven straight. Since the vehicle can be easily driven straight, a person who drives the vehicle need not learn how to drive the vehicle beforehand.

Like the motor-driven vehicle of claim 1, a motor-driven vehicle according to claim 14 includes a motor-driven vehicle includes a vehicle body on which a human may sit. First and second drive wheels are mounted on opposite sides of the vehicle body. A first motor drives the first drive wheel, and a second motor drives the second drive wheel. The first and second motors may be mounted on the vehicle body or may be disposed in a space defined in the respective drive wheels. First manual-driving-force sensing means senses a first manual driving force applied to rotate the first drive wheel, and second manual-driving-force sensing means senses a second manual driving force applied to rotate the second drive wheel. The first and second manual-driving-force sensing means may be mounted on the vehicle body or may be mounted on hand rims associated with the respective ones of the first and second drive wheels.

In addition, the vehicle of claim 14 includes control means which controls the first and second motors. The control means includes preliminary motor driving signal change amount computing means for computing a first amount of change D1 by which the first preliminary motor driving signal is to be changed, from the difference between the sensed first manual driving force and a reference value, and computing a second amount of change D2 by which the second preliminary motor driving signal is to be changed, from the difference between the sensed second manual driving force and the reference value. The control means also includes compensated change amount computing means for computing first and second compensated amounts of change CD1 and CD2 from the first and second amounts of change D1 and D2 for the first and second preliminary motor driving signals. The control means further includes compensated driving force computing means for computing a new first compensated motor driving signal FC1 for application to the first motor by modifying the first preliminary motor driving signal F1 currently applied to the first motor with the first compensated amount of change CD1 and for computing a new second compensated motor driving signal FC2 for application to the second motor by modifying the second preliminary motor driving signal F2 currently applied to the second motor with the second compensated amount of change CD2.

The compensated change amount computing means computes the first compensated amount of change CD1 by summing the first amount of change D1 multiplied by a preset compensation factor ar and the second amount of change D2 multiplied by a preset compensation factor br, i.e. ar·D1+br·D2. The second compensated amount of change CD2 is the sum of the second amount of change D2 multiplied by a preset compensation factor al and the first amount of change D1 multiplied by a preset compensation factor bl, i.e. al·D2+bl·D1. The compensation factors al and bl are chosen independently of the factors ar and br.

Let it be assumed that the first and second preliminary motor driving signals F1 and F2, which respectively cause the first and second motors to produce first and second preliminary mechanical driving forces F1 and F2, are incremented by first and second amounts of change D1 and D2, without the first and second compensated amounts of change taken into account. As described previously, the amounts of change D1 and D2 for the first and second preliminary motor driving signals F1 and F2 are based on the differences between the first and second manual driving forces and the reference values. Accordingly, if the manual driving forces are maintained at values above the reference values, the preliminary motor driving signals and, hence, the preliminary mechanical driving forces are incremented by D1 and D2, respectively even if the manual driving forces are not changed. Accordingly, if the running load on the vehicle increases while it is running; for example, when the vehicle running on a flat ground comes to climb up a slope, the vehicle driver need not increase the manual driving forces to cope with the increase of the running load.

Further, once the first and second preliminary mechanical driving forces are increased by increasing the first and second manual driving forces to values above the reference values, the vehicle can be continuously driven with the first and second preliminary mechanical driving forces at constant values by decreasing the first and second manual driving forces to the reference values and maintaining them at the reference values.

According to the invention of claim 14, however, the first and second amounts of change D1 and D2 are not added directly to the first and second preliminary motor driving signals F1 and F2, but the first and second compensated amounts of change CD1 and CD2 prepared from D1 and D2 are added to the first and second preliminary motor driving signals F1 and F2. Specifically, the first compensated amount of change CD1 is computed, using the expression ar·D1+br·D2, and the second compensated amount of change CD2 is computed, using the expression al·D2+bl·D1. Like this, the first and second compensated amounts of change CD1 and CD2 are influenced by the second and first manual driving forces, and, therefore, the compensated motor driving signals FC1 and FC2 which are to be applied to the first and second motors are influenced by the second and first manual driving forces, respectively. Accordingly, the actual mechanical driving forces FC1 and FC2 provided by the first and second motors, respectively, are influenced by the second and first manual driving forces, respectively. Accordingly, by changing either one of the manual driving forces, the first and second compensated motor driving signals FC1 and FC2 and, hence, the first and second actual mechanical driving forces change synchronously with each other, which ensures that the vehicle can be easily driven straight.

By returning the first and second manual driving forces to the reference values, the first and second compensated amounts of change CD1 and CD2 become zero, which maintain the first and second actual mechanical driving forces at constant values. Thus, the vehicle can be driven with desired values of the first and second mechanical driving forces, which improves the drivability of the vehicle.

According to the invention of claim 15, the control means of the motor-driven vehicle according to claim 14 computes first and second compensated amounts of change only when it judges that the first and second motors are driven in the same direction.

For the same reason as described for the invention of claim 2, the drivability of the vehicle is improved.

According to the invention of claim 16, the motor-driven vehicle according to claim 15 is arranged such that, in the first compensated amount of change CD1, the compensation factor ar for the first amount of change D1 is equal to or greater than the compensation factor br for the second amount of change D2, and in the second compensated amount of change CD2, the compensation factor al of the second amount of change D2 is equal to or greater than the compensation factor bl for the first amount of change D1. In other words, ar≧br and al≧bl.

For the same reason as described with respect to the invention of claim 3, the drivability of the motor-driven vehicle is improved.

According to the invention of claim 17, the motor-driven vehicle of claim 16 is arranged such that the sum of the compensation factors ar and br, i.e. ar+br, is chosen to be equal to the sum of the compensation factors al and bl, i.e. al+bl.

According to claim 17, the first and second compensated amounts of change CD1 and CD2 are approximate or equal to each other for the reason as described for the invention of claim 4, which improves the drivability of the vehicle.

According to the invention of claim 18, the motor-driven vehicle of claim 17 is arranged such that the compensation factors ar and al are equal (ar=al), and the compensation factors br and bl are equal (br=bl).

For the reason described with respect to the invention of claim 5, changes of the first and second compensated amounts of change caused by change of the first manual driving force are similar to changes of the second and first compensated amounts of change caused by change of second manual driving force, which results in improvement of the drivability of the motor-driven vehicle.

According to the invention of claim 19, the control means of the motor-driven vehicle according to claim 17 includes compensation factor computing means which computes the factors ar and al for the first and second amounts of change D1 and D2 forming part of the first and second compensated amounts of change CD1 and CD2, on the basis of the proportion between the first and second manual driving forces.

According to claim 19, the motor-driven vehicle can be easily driven straight or rotated, as desired, for the same reason as explained with respect to claim 6.

According to the invention of claim 20, the control means of the motor-driven vehicle of claim 17 computes the first and second compensated amounts of change CD1 and CD2 when the difference between the first and second manual driving forces are within a preset range.

According to claim 20, for the same reason as explained with respect to the invention of claim 7, staggering of the vehicle is prevented by making the first and second compensated amounts of change CD1 and CD2 close to each other.

According to the invention of claim 21, the motor-driven vehicle according to claim 16 is provided with input means for entering the respective compensation factors ar, al, br and bl in the compensated driving force computing means.

According to claim 21, for the same reason as explained for the invention of claim 8, the input means enables a vehicle driver to set any desired values for the compensation factors ar, br, al and bl suitable for him or her to drive it in a manner as he or she desires.

According to the invention of claim 22, the control means of the motor-driven vehicle of claim 15 is provided with a compensation table. The compensation table contains a plurality of compensation regions which are defined by a desired number of threshold values set for values of the first and second manual driving forces. The compensation table is used to determine the respective compensation factors ar, br, al and bl in accordance with the combination of compensation regions to which the first and second manual driving forces belong.

According to the invention of claim 22, as in the invention of claim 9, the driver's intention as to how drive the vehicle is judged by determining the compensation regions to which the first and second manual driving forces belong, and the compensation factors suitable for the driver's intention can be properly selected.

According to claim 23, all of the compensation factors ar, br, al and bl of the motor-driven vehicle of claim 22 are set to be between 0 and 1 inclusive.

Accordingly, the first and second compensated amounts of change DC1 and DC2 are within the range of the first and second amounts of change D1 and D2.

According to the invention of claim 24, the compensation table of claim 23 is arranged such that when the regions in which the first and second manual driving forces fall are spaced from each other by a relatively large distance, the compensation factor ar is set to be larger than the compensation factor br by a degree depending on the distance by which the region of the first manual driving force is spaced from the region of the second manual driving force when the first manual driving force is larger than the second manual driving force. On the other hand, when the second manual driving force is significantly larger than the first manual driving force, the compensation factor al is set to be larger than the compensation factor bl by a degree depending on the distance by which the region of the second manual driving force is spaced from the region of the first manual driving force.

For the same reason as explained with respect to the invention of claim 11, according to claim 24, in order to make it easier to turn or rotate the vehicle, the proportion of the first amount of change D1 in the first compensated amount of change CD1 or the proportion of the second amount of change D2 in the second compensated amount of change CD2 is made larger.

According to the invention of claim 25, the motor-driven vehicle according to claim 23 has the compensation table arranged such that when the compensation regions in which the first and second manual driving forces fall are the same, all of the compensation factors ar, br, al and bl assume the same value.

When the compensation regions in which the first and second manual driving forces fall are the same, which means that the difference between the first and second manual driving forces is zero or not larger, it may be considered that the driver intends to drive the motor-driven vehicle straight. In order to make it easier to drive the vehicle straight, all of the compensation factors ar, br, al and bl are made equal so that the first and second compensated amounts of change become equal to each other.

According to the invention of claim 26, the compensation table of the motor-driven vehicle of claim 23 contains two compensation regions A1 and A2 adjacent to each other on opposite sides of a threshold value which is equal to the reference value for the first and second manual driving forces, and a plurality of outer compensation regions defined outside the regions A1 and A2. When the first and second manual driving forces fall in one or the other of the adjacent compensation regions A1 and A2, the compensation factors ar and bl for the amount of change D1, for example, falling in the region A1, for example, assume zero, and the compensation factors br and al for the amount of change D2 falling in the region A2 assume a value greater than zero.

The fact that the first and second manual driving forces fall in one and the other of the adjacent compensation regions A1 and A2 indicates that the first and second manual driving forces are approximately equal to each other. In the above-described example according to claim 26, the first compensated amount of change CD1 is br·D2 and the second compensated amount of change CD2 is equal to al·D2. Thus, both the first and second compensated amounts of change CD1 and CD2 are dependent on one of the amounts of change, e.g. D2, in the illustrated example. Thus, the vehicle can be easily driven straight.

According to the invention of claim 27, in the compensation table of the motor-driven vehicle of claim 26, the compensation factors ar and bl for the first amount of change D1 corresponding to the first manual driving force, for example, falling in one, e.g. A1, of the two adjacent compensation regions below the reference value, are set to zero.

When both of the first and second manual driving forces fall in the adjacent compensation regions, it may be judged that the vehicle driver intends to drive the vehicle straight. The amount of change based on a manual driving force falling in the lower one of the adjacent compensation regions has a negative value, and, therefore, the compensated amount of change based on the negative amount of change is small, so that the vehicle's speed may be reduced. According to claim 27, the amount of change based on a manual driving force falling in one of the adjacent compensation regions below the reference value is neglected, and br·D2, for example, is used as CD1 and al·D2, for example, is used as CD2 so that the first and second compensated amounts of change are controlled to tend to increase.

According to the invention of claim 28, the compensation table of the motor-driven vehicle according to claim 27 is arranged such that the compensation factors al and br for the second amount of change D2, for example, corresponding to the second one, for example, of the first and second manual driving forces falling in one of the adjacent compensation regions above the reference value, for example, the compensation region A2, are set to values greater than zero, and one of these compensation factors, al, for example, is set to a value greater than that of the other compensation factor br.

According to claim 28, when the situation is similar to the one as described above with respect to claim 27, CD1 is equal to br·D2 and CD2 is equal to al·D2, so that the compensated driving forces increase. However, because the first manual driving force is smaller, the first compensated amount of change CD1 is also chosen to be smaller.

BRIEF DESCRIPTION OF THE DRAWINGS

FIG. 1A and FIG. 1B illustrate principles of the motor-driven vehicle control according to the present invention.

FIG. 3 is a rear view of the motor-driven vehicle shown in FIG. 2.

FIG. 12 is a flow chart showing one example of computation of compensation factors of the motor-driven vehicle of FIG. 2.

FIG. 14 is a flow chart showing the operation of the control unit of a first modification of the motor-driven vehicle shown in FIG. 2.

FIG. 15 is a table for use in another example of the computation of the compensation factors of the motor-driven vehiole shown in FIG. 2.

FIG. 18 is a flow chart of part of the operation of the control unit of a third modification of the motor-driven vehicle shown in FIG. 2.

DETAILED DESCRIPTION OF THE INVENTION

Figure 2:
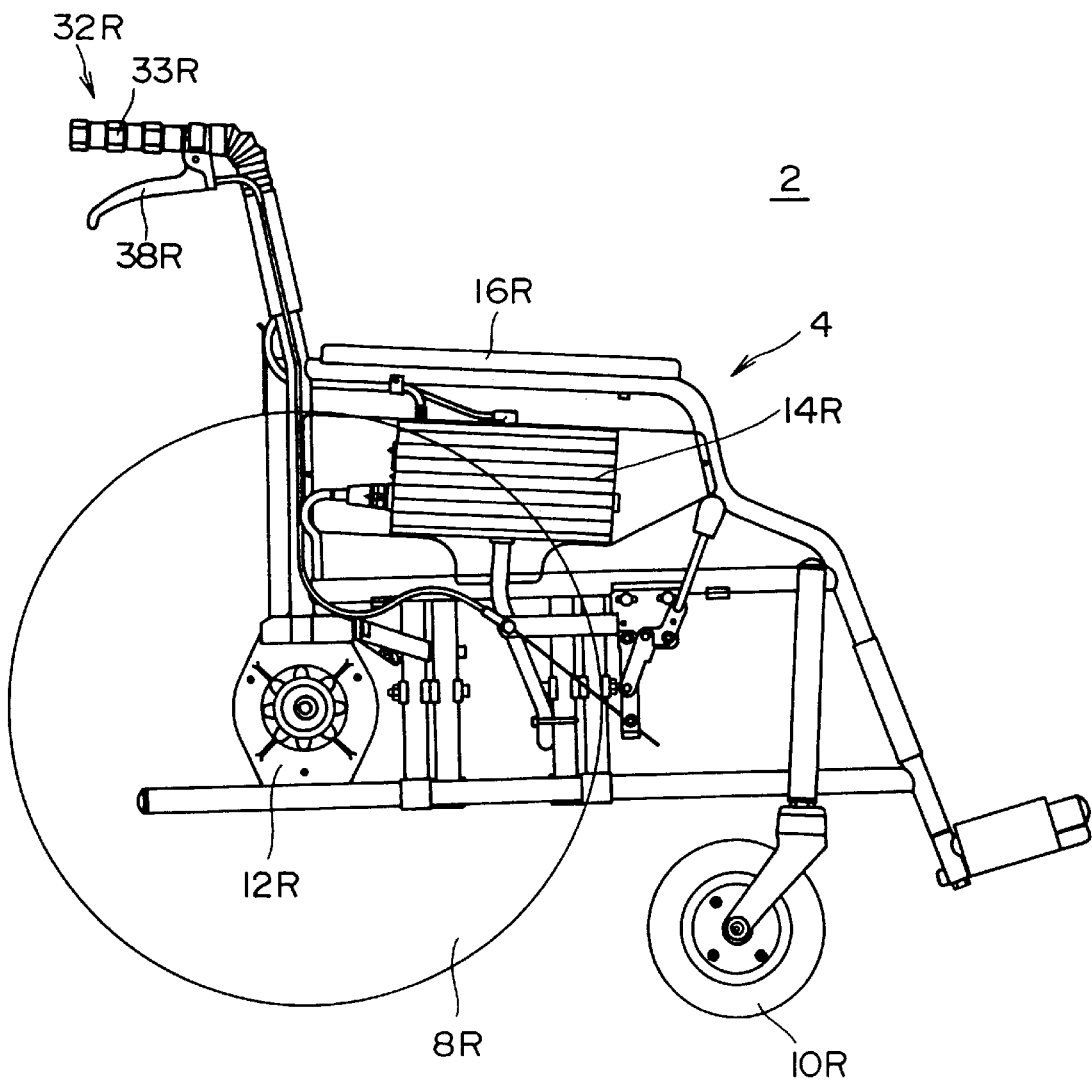
FIG. 2 is a side view of a motor-driven vehicle according to one embodiment of the present invention.

The present invention is described with reference to a motor-driven vehicle, such as a motor-driven wheelchair, by way of example. As shown in FIGS. 2 and 3, a motor-driven wheelchair 2 includes a vehicle body 4 which is a framework of piping. A seat of cloth 6 on which a wheelchair user can sit is stretched over the space between the sides of the framework of the body 4, as shown in FIG. 3. In the rear part of the body 4, drive wheels 8R and 8L are rotatably mounted on opposing right and left sides of the body 4, respectively. (In this specification, the letter "R" or "r" denotes "right" and the letter "L" or "l" denote "left". Accordingly, any reference numerals and letters with "R" or "r" attached at the end thereof are for components or functions relating directly or indirectly to the right-hand side drive wheel 8R, while any reference numerals and letters with "L" or "l" attached at the end thereof are for components or functions relating directly or indirectly to the left-hand side drive wheel 8L.) Auxiliary wheels 10R and 10L are mounted on the opposing sides of the front part of the body 4. In order to illustrate the structure of the body 4 clearly, the driving wheel 8R is drawn by a thin line in FIG. 2.

Driving units, e.g. electric motors 12R and 12L, for driving the drive wheels 8R and 8L are mounted on the vehicle body 4 on its opposite sides. The motors 12R and 12L are coupled to the drive wheels 8R and 8L, respectively. The motors 12R and 12L may be disposed within the boundaries of the wheels 8R and 8L. Controllers 14R and 14L for controlling the motors 12R and 12L, respectively, are mounted on the vehicle body 4. The controller 14R is located below a right-hand side arm rest 16R, and the controller 14L is located below a left-hand side arm rest 16L. Batteries 18R and 18L from which the controllers 14R and 14L and the motors 12R and 12L are operated are disposed in hollows formed in the arm rests 16R and 16L or in two pockets 20 in the back of the seat 6.

Figure 4:
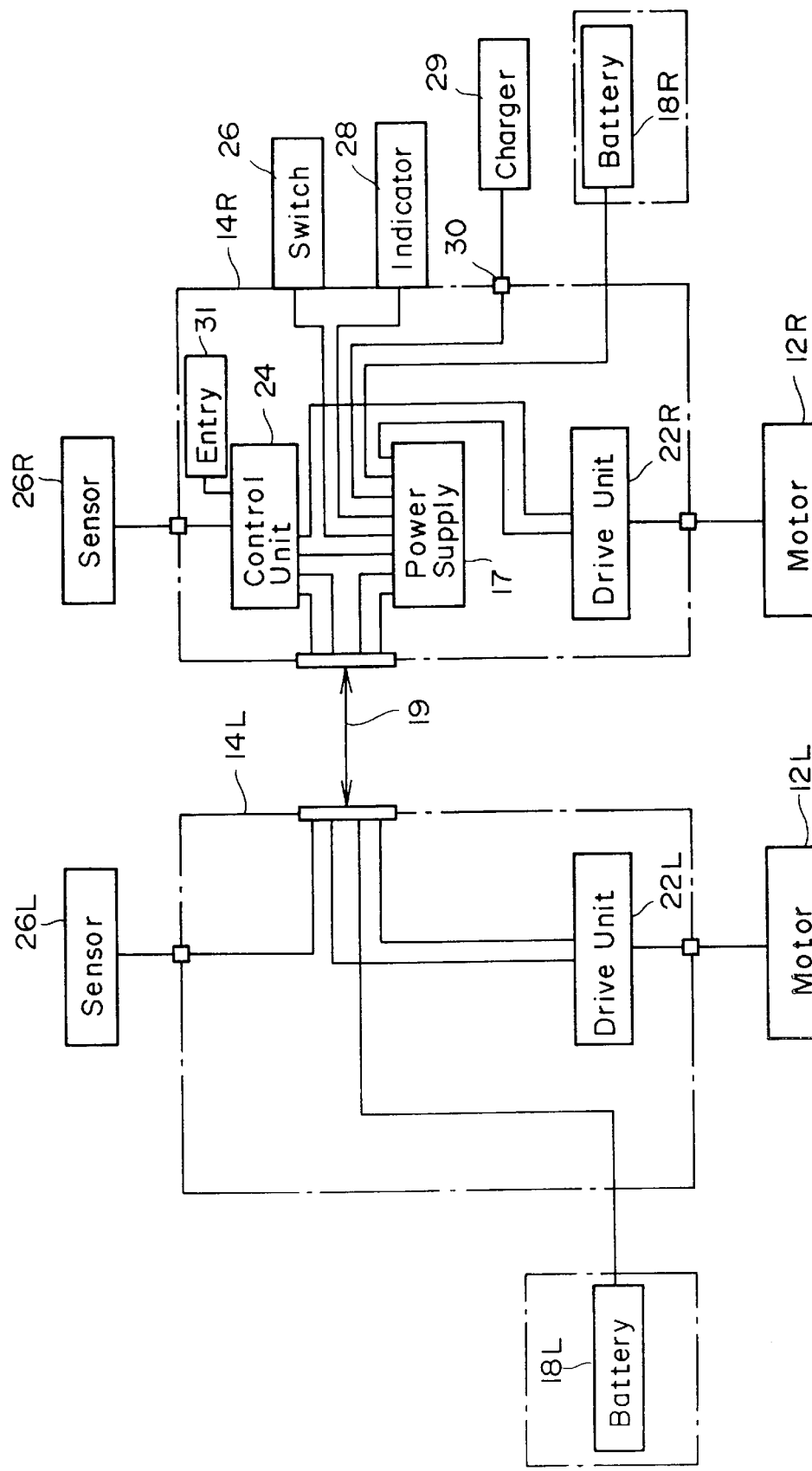
FIG. 4 is a block diagram of the electrical circuit section of the motor-driven vehicle shown in FIG. 2.

As shown in FIG. 4, the controller 14R includes a power supply circuit 17, which is fed with a DC voltage from the battery 18R and also fed with a DC voltage from the battery 18L through the controller 14L and a transmission cable 19. The power supply circuit 17 converts the supplied DC voltages into voltages suitable for operation of drive units 22R and 22L and into DC voltages suitable for operation of a control unit 24.

The drive unit 22R is included in the controller 14R, and the drive unit 22L is included in the controller 14L. The drive units 22R and 22L include bridge circuits formed of semiconductor switching devices, for example, which are supplied with a DC voltage from the power supply circuit 17. The semiconductor switching devices are supplied with a pulse width controlled (PWM) signal from the control unit 24 in the controller 14R, for driving the respective motors 12R and 12L.

Also, the controller 14R includes a switch 26 for activating the control unit 24 and other circuits, and an indicator lamp 28 indicating when the control unit 24 is operating. Terminals 30 for connection to a charger 29 for charging the batteries 18R and 18L are also disposed in the controller 14R.

The control unit 24 may include a microprocessor, which receives signals from manual-driving-force sensing units 32R and 32L, which are related to the manual driving forces applied to handlebars 33R and 33L of the manual-driving-force sensing units 32R and 32L. As shown in FIGS. 2 and 3, the handlebars 33R and 33L extend in parallel backward from the opposite sides of the rear part of the vehicle body 4. The manual-driving-force sensing units 32R and 32L sense independently the manual driving forces applied to the handlebars 33R and 33L by the attendant for the wheelchair user, and develop the manual-driving-force related signals which are related to the respective manual driving forces as detected by the sensing units 32R and 32L.

The manual driving force applied to the manual-driving-force sensing unit 32R is transmitted to the drive wheel 8R through the vehicle body 4 so that the drive wheel 8R is driven to rotate, and the manual driving forces applied to the manual-driving-force sensing unit 32L is transmitted to the drive wheel 8L through the vehicle body 4 so that the drive wheel 8L is driven to rotate.

Each of the manual-driving-force sensing units 32R and 32L may include a potentiometer. The value provided by the potentiometer changes according to the amount of displacement of the corresponding handlebar 33R or 33L in the forward or rearward direction from its neutral position (i.e. the position the handlebar assumes when no manual driving force is applied to it). The amount of displacement is dependent on the magnitude of the manual driving force applied to that handlebar. The change of the value is sensed, and a manual driving force related signal is developed.

In place of potentiometers, bridge circuits including strain gauges may be used.

Figure 5:
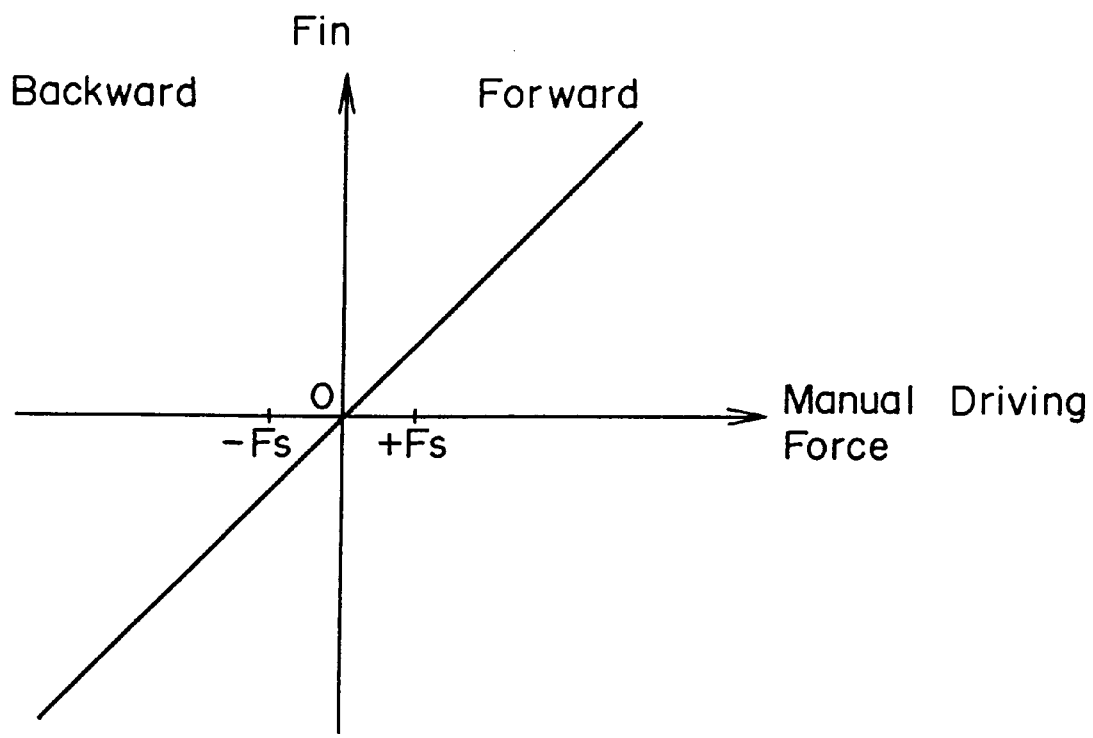
FIG. 5 shows a relationship between a manual driving force and a manual-driving-force representative signal developed by a circuit of the motor-driven vehicle shown in FIG. 2.

The manual-driving-force related signals from the manual-driving-force sensing units 32R and 32L are at a predetermined voltage when no manual driving force is applied to the handlebars. When manual driving forces tending to drive the motor-driven wheelchair forward, hereinafter referred to as forward manual driving forces, are applied to the handlebars 33R and 33L, the voltage values of the respective manual-driving-force related signals rise from the predetermined voltage by amounts determined by the magnitudes of the manual driving forces applied to the handlebars. If manual driving forces tending to drive the wheelchair backward, hereinafter referred to as backward manual driving forces, are applied to the handlebars 33R and 33L, the voltage values of the respective manual-driving-force related signals fall from the predetermined voltage by amounts determined by the magnitudes of the manual driving forces applied to the handlebars. The manual-driving-force related signals are applied to the control unit 24, where the predetermined voltage value is subtracted from the manual-driving-force related signals, and are converted into manual-driving-force representative signals FinR and FinL, shown in FIG. 5, which are zero when no manual driving forces are applied, assume a positive value when forward manual driving forces are applied, and assume a negative value when backward manual driving forces are applied to the handlebars 33R and 33L.

In place of the described and illustrated manual-driving-force sensing units, manual-driving-force sensing means mounted on or in hand rims 36R and 36L secured to the drive wheels 8R and 8L, respectively, may be used, which independently detect the manual driving forces the wheelchair user applies to the hand rims 36R and 36L.

The motor-driven wheelchair includes mechanical brakes which are operated by means of grips 38R and 38L attached to the lower parts of the handlebars 33R and 33L.

Now, the control provided by the control unit 24 for the motors 12R and 12L is described.

Figure 11:
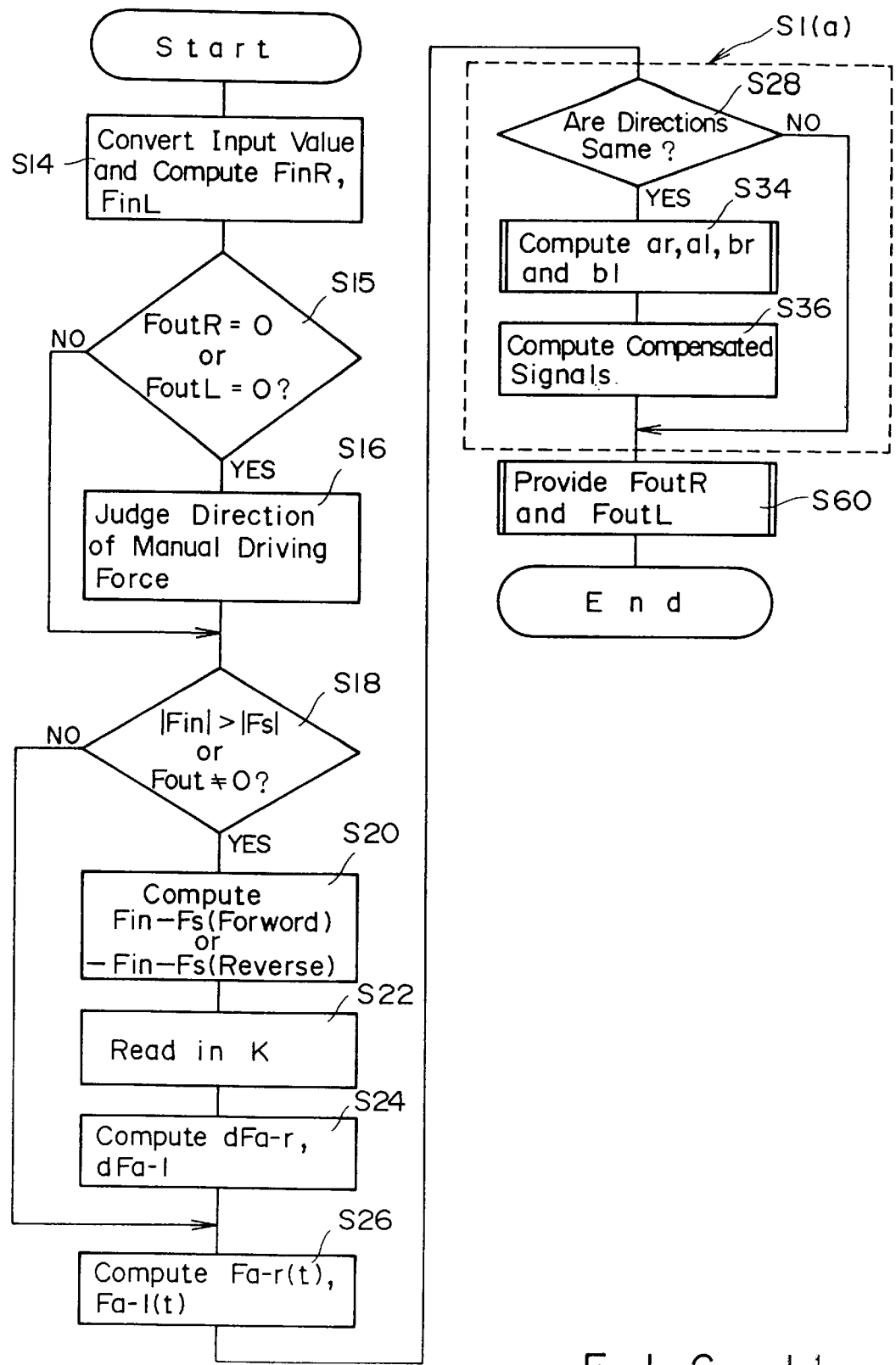
FIG. 11 is a flow chart showing the operation of the control unit of the motor-driven vehicle shown in FIG. 2.

First, the motor control based on the amount of change by which the mechanical driving force should be changed is described with reference to FIGS. 6 and 11. Although FIG. 11 illustrates the control of the motor 12L as well as the control of the motor 12R, the control of the motor 12L is described later and, therefore, is not discussed here, and only the control of the motor 12R is described. It should be noted, however, that the control of the motor 12L is done in the same way as the control of the motor 12R. Furthermore, the section S1(=i a) within a broken-line square in FIG. 11 will be described later and is not discussed here.

Usually, when a manual driving force applied to the handlebar changes, the mechanical driving force produced by the motor should be changed. FIG. 6 shows a relationship between a signal dFa-r representative of the amount of change by which a preliminary motor driving signal to be applied to the motor 12R to drive it should be changed to change the mechanical driving force, and the manual-driving-force representative signal FinR. The relationship is used to compute a new preliminary motor driving signal Fa-r(t) to be applied to the motor 12R so that the motor produces a new mechanical driving force. The amount of change dFa-r for the preliminary motor driving signal, hereinafter referred to as motor-driving-signal change amount dFa-r, is allotted along the vertical axis, while the manual-driving-force representative signal FinR is allotted along the horizontal axis.

The control unit 24 computes the motor-driving-signal change amount dFa-r by an expression, K(FinR−Fs), where K is a factor. In FIG. 6, a solid line indicates the relationship with K=1, while a dot-and-dash line indicates the relationship with K=0.5. Fs represents a preset reference value. When FinR=Fs, the motor-driving-signal change amount dFa-r is zero.

The control unit 24 computes the motor-driving-signal change amount dFa-r in the above-described manner, and adds the computed dFa-r to the current preliminary motor driving signal Fa-r(t−1) to produce a new preliminary motor driving signal Fa-r(t). An actual motor driving signal FoutR is computed from the preliminary motor driving signal Fa-r(t) with a PID (proportional-plus-integral-plus-derivative) factor taken into account. The actual motor driving signal FoutR is converted to a PWM signal before it is applied to the drive unit 22R.

To this end, the control unit 24 samples the manual-driving-force related signal from the sensing unit 32R at predetermined time intervals, e.g. at intervals of 1/100 second, to thereby convert it into the manual-driving-force representative signal FinR, as shown in FIG. 11 (Step S14). The control unit 24 makes a judgment as to whether the actual motor driving signal FoutR is zero or not (Step S15). If FoutR is zero, the control unit 24 determines that the new preliminary motor driving signal Fa-r(t) is a signal tending to drive the motor 12R in the forward direction (hereinafter referred to as forward signal) or a signal tending to drive the motor 12R in the reverse direction (hereinafter referred to as reverse signal), depending on the polarity of the manual-driving-force representative signal FinR (Step S16). If the new preliminary motor driving signal Fa-r(t) is a forward signal, i.e. if FinR has a positive value, the control unit 24 reads in the value of FinR as it is, but if the new preliminary motor driving signal Fa-r(t) is a reverse signal, it reads in FinR after reversing the polarity of FinR.

Thus, if FinR is positive when the actual motor driving signal FoutR is zero, the direction of the preliminary motor driving signal Fa-r(t) is judged to be forward and the value of FinR is read in as it is. If FinR is negative when the actual motor driving signal FoutR is zero, the direction of the preliminary motor driving signal Fa-r(t) is judged to be reverse, and the value of the reversed FinR is read in.

After the direction of the preliminary motor driving signal Fa-r(t) is determined, a judgment is made as to whether FinR has exceeded the reference value Fs or if FoutR is not zero (Step S18). If the answer to Step S18 is YES, the difference between FinR and the reference value Fs is calculated (Step S20). The factor K determined in a manner described later is read in (Step S22). The amount of change, dFa-r, for the preliminary motor driving signal shown in FIG. 6 is computed, using the difference computed in Step S20 and the factor K (Step S24). The computed amount of change dFa-r is added to the current preliminary motor driving signal Fa-r(t−1), which results in a new preliminary motor driving signal Fa-r(t) (Step S26).

If the answer to Step S18 is NO, Step S26 is immediately executed. In this case, since the actual motor driving signal FoutR is zero and the absolute value of FinR has not exceeded the absolute value of Fs, the amount of change dFa-r is not computed even though the direction of the preliminary motor driving signal Fa-r(t) has been determined in Step S16. Accordingly, the motor-driven wheelchair is driven only by the manual driving forces until the absolute value of the manual-driving-force representative signals Fin exceed the absolute value of the reference value Fs.

As described above, the PWM signal to be applied to the drive unit 22R is the actual motor driving signal FoutR which has resulted from PID controlling the preliminary motor driving signal Fa-r(t), and which has been converted into a PWM signal form in Step S60. But, in the above description, the preliminary motor driving signal Fa-r(t) itself has been described to be applied to the drive unit 22R, for simplifying the explanation. Also, in a practical embodiment, a direction signal corresponding to the direction of the preliminary motor driving signal is also developed together with the PWM signal, but it has not been described, for simplifying the explanation.

As described above, the amount of change dFa-r for the preliminary motor driving signal is added to the current preliminary motor driving signal Fa-r(t−1) to produce a new preliminary motor driving signal Fa-r(t). Therefore, if the reference value is 3 and FinR is maintained to be 4, with K=1, for example, the motor-driving-signal change amount dFa-r continues to be 1. Accordingly, even if the manual driving force is not increased, the preliminary motor driving signal Fa-r is successively incremented by 1 from 1 to 2, and so forth. Thus, when the running resistance to the wheelchair increases, there is no need for increasing the manual driving force.

Assume, for example, that the reference value Fs is 3, and FinR successively assumes values of 4, 6, 7, 8, 7, 5, 4, 2, 1, 1, and then 3. In this case, the motor-driving-signal change amount successively assumes values of 1, 3, 4, 5, 4, 2, 1, −1, −2, −2, and 0. This causes the preliminary motor driving signal Fa-r(t) to successively assume values of 1, 4, 8, 13, 17, 19, 20, 19, 17, 15, and 15. After that, if FinR is maintained at 3 which is equal to the reference value Fs, the preliminary motor driving signal Fa-r(t) continues to be 15. Accordingly, after application to the manual-driving-force sensing unit 32R of such a manual driving force as to result In a desired motor driving force with the manual driving force ultimately maintained at the preset value, the maintenance of the manual driving force applied to the sensing unit 32R at the reference value Fs results in the maintenance of the desired motor driving force.

Figure 6:
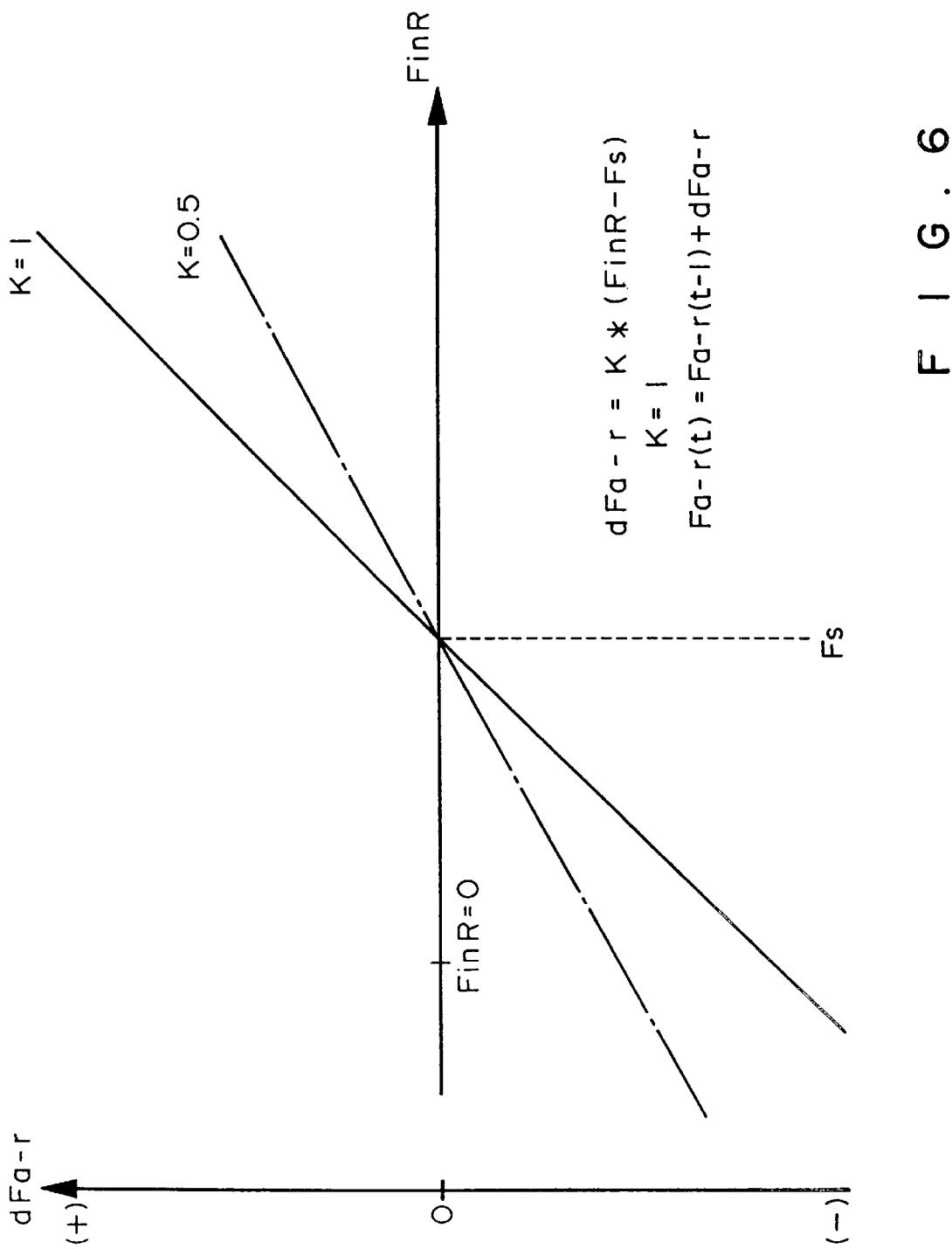
FIG. 6 shows a first example of the relationship between the manual-driving-force representative signal and the amount of change by which the preliminary motor driving signal is to be changed in the motor-driven vehicle shown in FIG. 2.

In the above-described example, the factor K is equal to 1 and, therefore, the difference between FinR and Fs itself is used as the amount of change dFa-r, as represented by the solid line in FIG. 6. The motor-driving-signal change amount dFa-r, however, can be (FinR−Fs) multiplied by the factor K which can be of any value, e.g. a value greater than 0 and close to 1, or may be greater than 1. When the factor K is, for example, 0.5 as represented by the dash-and-dot line in FIG. 6, the response of the preliminary motor driving signal to the change of the manual-driving-force representative signal FinR is slow.

The description given above about the motor-driving-signal change amount dFa-r and the new preliminary motor driving signal Fa-r(t) is for the case in which the manual-driving-force representative signal FinR assumes a positive value, i.e. the motor 12R is to be rotated in the forward direction, with the actual motor driving signal FoutR being zero. If the manual-driving-force representative signal FinR changes to a negative value (for rotating the motor 12R in the reverse direction) when the actual motor driving signal FoutR is zero, an inverted version of FinR is used as FinR in computing the new preliminary motor driving signal Fa-r(t). This computation is carried out in a similar manner to the computation performed when FinR is of a positive value. The use of FinR as it is or the use of the inverted version of FinR continues until FoutR next assumes zero and the direction of the preliminary mechanical driving force (signal) is determined anew.

The factor K for use in computing the motor-driving-signal change amount dFa-r has been described to be constant for any value of FinR. However, as shown in FIGS. 7 through 10, the factor K can be changed for different ranges of values of FinR.

Figure 7:
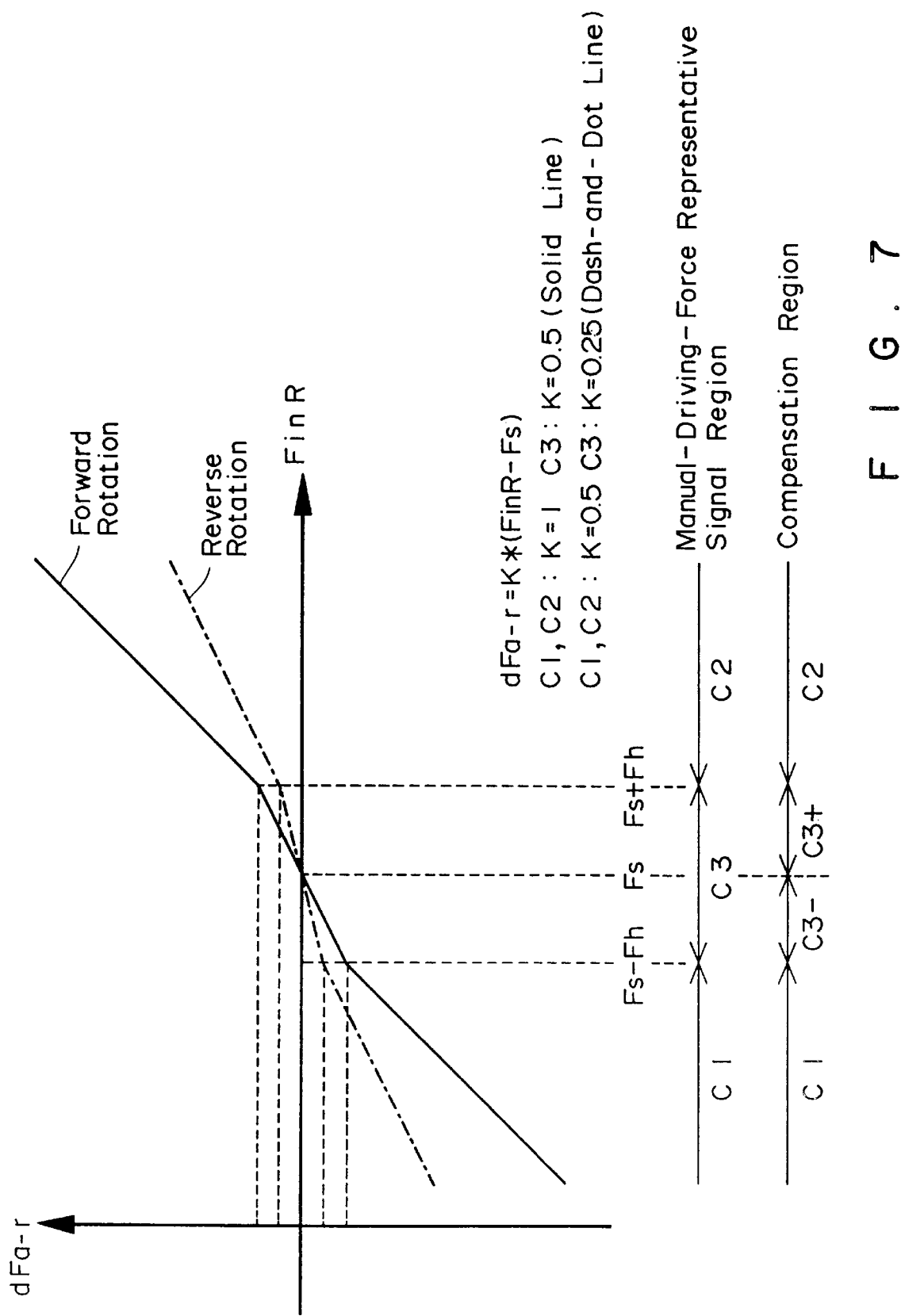
FIG. 7 shows a second example of the relationship between the manual-driving-force representative signal and the amount of change by which the preliminary motor driving signal is to be changed in the motor-driven vehicle shown in FIG. 2.

In FIG. 7, on the opposite sides of the reference value Fs, threshold values Fs−Fh and Fs+Fh are set to define manual-driving-force representative signal regions, where 0<Fh<Fs. Both in a region C1 in which FinR is smaller than Fs−Fh and a region C2 in which FinR is greater than Fs+Fh, the factor K=1 is used. In a region C3 in which FinR is between Fs−Fh and Fs+Fh inclusive, the factor K=0.5 is used.

Because the factor K is smaller in the region near the reference value Fs, the response of the preliminary motor driving signal Fa-r(t) to variations of FinR near the reference value Fs can be slow, so that the operation of the motor-driven wheelchair 2 can be stable.

Figure 8:
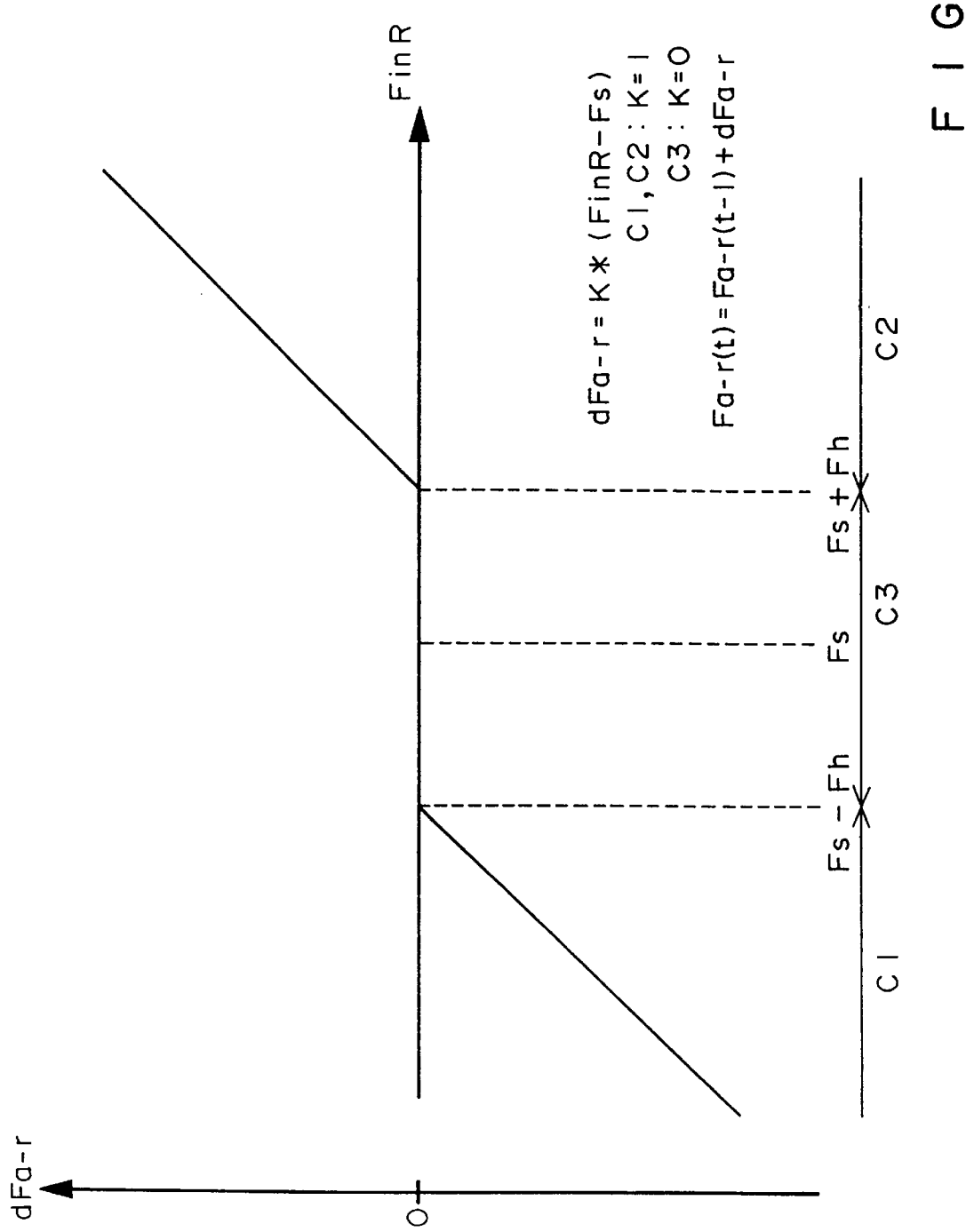
FIG. 8 shows a third example of the relationship between the manual-driving-force representative signal and the amount of change by which the preliminary motor driving signal is to be changed in the motor-driven vehicle shown in FIG. 2.

In the example shown in FIG. 8, the same manual-driving-force representative signal regions C1, C2 and C3 as those of FIG. 7 are defined. The factor K has a value of, for example, 1, in the regions C1 and C2, and has a value of, for example, zero in the region C3. With the factor K=0 in the region C3, the preliminary motor driving signal Fa-r(t) does not change even when FinR changes in the region near the reference value Fs. Accordingly, the operation of the motor-driven wheelchair 2 is stable and its drivability increases.

In the example shown in FIG. 9, two thresholds Fs−Fh1 and Fs−Fh2 are set below the reference value Fs, and two thresholds Fs+Fh1 and Fs+Fh2 are set above the reference value Fs (where Fh1<Fh2). In the region C4 where FinR is smaller than Fs−Fh2 and in the region C5 where FinR is greater than Fs+Fh2, the factor K equal to, for example, 0.5 is employed. In the region C6 where FinR Is equal to or greater than Fs−Fh2 but smaller than Fs−Fh1 and in the region C7 where FinR is greater than Fs+Fh1 but equal to or smaller than Fs+Fh2, the factor K is 1.2, for example. In the region C8 in which FinR is not smaller than Fs−Fh1 and not greater than Fs+Fh1, the factor K is 0.5, for example.

The factor K is greater in the manual-driving-force representative signal regions C6 and C7 than in the regions C4, C5 and C8, and, accordingly, a time period during which FinR is offset from the reference value Fs can be reduced. Further, because of a smaller value of the factor K in the regions C4 and C5 which are remotest from the reference value Fs, rapid acceleration or deceleration of the motor-driven wheelchair 2 can be prevented even when FinR changes so greatly as to enter into these regions. In the region C8 in which the reference value Fs is located, the factor K is smaller. Accordingly, as in the case shown in FIG.

7, the response of the mechanical driving force to changes in FinR when it is near the reference Value Fs can be slow so that the operation of the motor-driven wheelchair 2 can be stable. Thus, the drivability of the wheelchair 2 is improved. Furthermore, the motor-driven wheelchair 2 can be easily driven straight when FinR is near the reference value Fs.

The illustrated values of the factor K for the regions C4 through C8 are only an example, and all of the regions C4 through C8 may have different values. Furthermore, the number of the manual-driving-force representative signal regions is not limited to five, but it may be any number greater than two.

Figure 10:
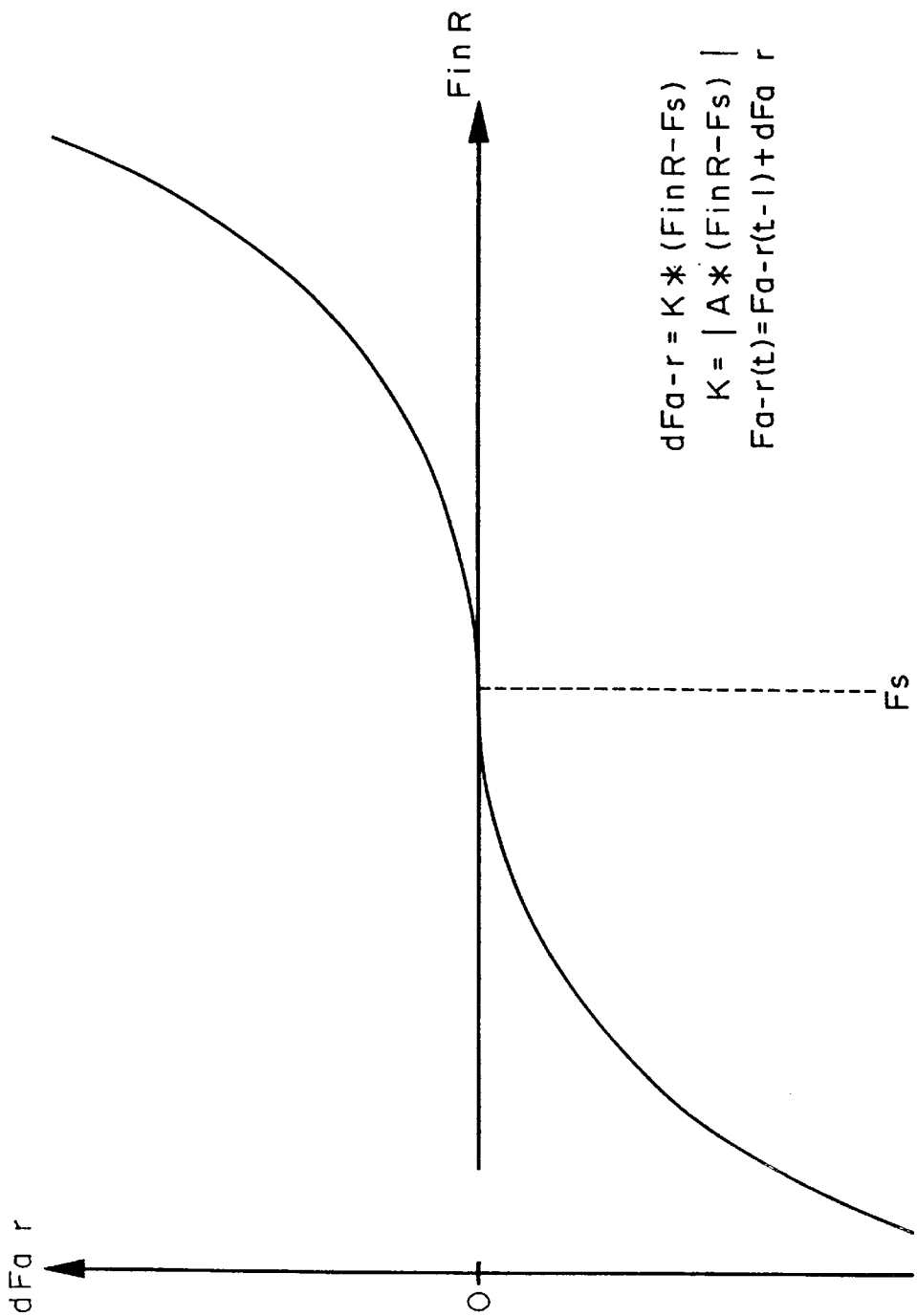
FIG. 10 shows a fifth example of the relationship between the manual-driving-force representative signal and the amount of change by which the preliminary motor driving signal is to be changed in the motor-driven vehicle shown in FIG. 2.

In the case shown in FIG. 10, the factor K is the absolute value of the difference between FinR and Fs, multiplied by a predetermined constant A. Thus, dFa-r is a monotonously increasing quadratic function with (|FinR|−|Fs|) being an argument. Accordingly, when FinR is in the vicinity of the reference value Fs, the response of the preliminary motor driving signal Fa-r(t) can be suppressed, so that the operation of the motor-driving wheelchair 2 can be stable. As FinR goes farther from the reference Value Fs, the response of the preliminary motor driving signal Fa-r(t) increases. That is, by increasing FinR, a larger preliminary motor driving signal Fa-r(t) and, hence, a larger mechanical driving force, can be developed. Thus, the wheelchair driver can drive the wheelchair smoothly.

The factor K may be the absolute value of the m-th power of the difference between FinR and the reference value Fs, multiplied by the constant A, where m is an integer equal to greater than 2.

FIGS. 7 through 10 show the relationships between FinR and the motor-driving-signal change amount dFa-r from a time when the actual motor driving signal FoutR is zero and FinR is judged to be positive to the time when the actual motor driving signal next returns to zero. In contrast, during a time period between a time when the actual motor driving signal FoutR is zero and FinR is judged negative and and the time when the actual motor driving signal FoutR next changes to zero, the motor-driving-signal change amount dFa-r is determined by −FinR−Fs.

In the examples shown in FIGS. 6 through 10, the same relationship is used both for the forward and reverse manual driving forces, but different relationships may be used. For example, as shown in FIG. 7, the factor K can be varied as represented by the solid line for the forward manual driving force, while it may be varied as represented by the dot-and-dash line for the reverse manual driving force.

The preliminary motor driving signal Fa-l(t) for the motor 12L is computed from the motor driving signal change amount dFa-l and the current preliminary motor driving signal Fa-l(t) in the same manner as described with reference to FIGS. 6 through 11.

According to the illustrated embodiment of the invention, both preliminary motor driving signals Fa-r and Fa-l are used to determine a compensated motor driving signal Fa-rw(t) for the motor 12R and a compensated motor driving signal Fa-lw(t), as will be described later, and the compensated motor driving signals are converted into the actual motor driving signals FoutR and FoutL which are then converted into PWM signals for application to the drive units 22R and 22L, respectively.

More specifically, as shown in FIG. 1A, the motor-driving-signal change amounts dFa-r and dFa-l are computed in the manner as described above (Steps S2 and S4). From dFa-r and the current compensated motor driving signal Fa-rw(t−1), the preliminary motor driving signal Fa-r(t) is computed (Step S6), and from dFa-l and the current compensated motor driving signal Fa-lw(t−1), the preliminary motor driving signal Fa-l(t) is computed (Step S8).

The new compensated motor driving signal Fa-rw(t) for the motor 12R is computed from the preliminary motor driving signal Fa-r(t) for the motor 12R with the preliminary motor driving signal Fa-l(t) for the motor 12L taken into account. For example, Fa-r(t) is multiplied by a factor ar, and Fa-l(t) is multiplied by a factor br. The products ar·Fa-r(t) and br·Fa-l(t) are summed to develop the compensated motor driving signal Fa-rw(t) (Step S10).

Similarly, the new compensated motor driving signal Fa-lw(t) for the motor 12L is computed from the preliminary motor driving signal Fa-l(t) for the motor 12L with the preliminary motor driving signal Fa-r(t) for the motor 12R taken into account. For example, Fa-l(t) is multiplied by a factor al, and Fa-r(t) is multiplied by a factor bl.

The products al·Fa-l(t) and bl·Fa-r(t) are summed to develop the compensated motor driving signal Fa-lw(t) (Step S12).

The factors ar, br, al and bl may be any value. It is preferred, however, that ar≧br and al≧bl. With these relationships in value for the factors, the proportion of Fa-r(t) in Fa-rw(t) is larger than that of Fa-l(t), and the proportion of Fa-l(t) in Fa-lw(t) is larger than that of Fa-r(t), which makes it easier to turn or revolve the motor-driven wheelchair 2 even when the directions of rotation of the motors 12R and 12L are the same.

Also it is preferred that ar≧br and al≧bl and, in addition, ar+br=al+bl. If it is arranged that, for example, ar+br=1 and al+bl=2, and if FinR and FinL do not vary, Fa-rw(t) will be a value between FinR and ½ (FinR+FinL) determined depending on the values of ar and br, while Fa-lw(t) is a value between 2FinL and (FinR+FinL) determined depending on the values of al and bl. Thus, Fa-rw(t) and Fa-lw(t) are unbalanced. On the other hand, if ar+br and al+bl are equal to the same fixed value, for example, 1, Fa-rw(t) assumes a value between FinR and ½ (FinR+FinL) determined depending on the values of at and br, and Fa-lw(t) assumes a value between FinL and ½(FinR+FinL) determined depending on the values of al and bl. That is, Fa-rw(t) and Fa-lw(t) are more close to each other than when ar+br≠al+bl, so that the drivability of the motor-driven wheelchair is improved.

Alternatively, it may be so arranged that ar≧br, al≧bl, ar=al and br=bl. In this case, the proportion of the preliminary motor driving signal Fa-r(t) in Fa-rw(t) is equal to that of the preliminary motor driving signal Fa-l(t) in Fa-lw(t), and the proportion of the preliminary motor driving signal Fa-l(t) in Fa-rw(t) is equal to that of the preliminary motor driving signal Far(t) in Fa-lw(t). Therefore, the changes of Fa-rw(t) and Fa-lw(t) resulting from changing the right manual driving force by a given amount are equal to the changes of Fa-rw(t) and Fa-lw(t) resulting from changing the left manual driving force by the same amount. Accordingly, if one can know how the compensated motor driving signal for the motor 12R changes when the manual driving force applied to the right-hand side manual-driving-force sensing unit 32R is changed, the driver can know how the change of the compensated motor driving signal for the motor 12L can change when the driver changes the manual driving force applied to the left-hand side manual-driving-force sensing unit 32L. Thus, the drivability of the wheelchair is improved.

Also, it may be arranged that ar≠al and br≠bl. In this case, the proportion in the compensated motor driving signal Fa-rw(t) of its major component, namely, the preliminary motor driving signal Fa-r(t) and the proportion of Fa-l(t) in the compensated motor driving signal Fa-lw(t) can be different. If the strength of the right arm of the attendant differs from that of his left arm, the manual driving force applied by the right arm, for example, is larger than the manual driving force applied by the left arm. In other words, the right manual-driving-force representative signal FinR is larger than the left manual-driving-force representative signal FinL. In such a case, the proportion of Fa-r(t) in Fa-lw(t) may be made larger to thereby compensate the left manual-driving-force representative signal (and, hence, the manual driving force provided by the left arm) for its shortage so that Fa-rw(t) and Fa-lw(t) can be close to each other. This can prevent the motor-driven wheelchair 2 from meandering.

To this end, the control unit 24 executes the processing shown in FIG. 11.

First, the control unit 24 converts an input value at the sampling intervals. The manual-driving-force related signals sensed by the manual-driving-force sensing units 32R and 32L are applied to the control unit 24 and converted into the manual-driving-force representative signals FinR and FinL.

Next, a judgment is made as to whether determination of the direction of the mechanical driving force has to be made or not. For that purpose, whether either one of the right and left actual motor driving signals FoutR and FoutL is zero or not is judged (Step S15). If either one is zero, a judgment is made as to whether the manual-driving-force representative signal corresponding to that actual motor driving signal is positive or negative, to thereby determine whether the motor to which the actual motor driving signal is to be applied is to be rotated in the forward direction or in the reverse direction. Also, depending on the direction in which that motor is to be rotated, whether FinR (or FinL) or inverted FinR (or FinL) should be read in is determined (Step S16). If neither of the actual motor driving signals is judged to be zero in Step S15, Step S16 is not executed.

In case that neither of the motors 12R and 12L need be driven, some steps are skipped. For that purpose, whether the absolute value of FinR or FinL is larger than the absolute value of the reference value Fs or not, or whether the actual motor driving signals FoutR and FoutL are non-zero or not is judged (Step S18). The answer to Step S18 is NO only when the absolute value of FinR is smaller than the absolute value of the reference value Fs, the absolute value of FinL is smaller than the absolute value of the reference value Fs, and the right and left actual motor driving signals FoutR and FoutL are zero. Accordingly, once the absolute value of FinR or FinL exceeds the absolute value of the reference value Fs to thereby energize the motor 12R or 12L to rotate, even if the absolute value of FinR or FinL decreases below the absolute value of the reference value Fs thereafter, the answer to Step S18 will be YES because the motors 12R and 12L are being driven.

If the answer to Step S18 is YES, and the direction in which the motor is to be rotated has been judged to be forward when FoutR is zero, the difference between FinR and Fs is computed, and if the answer to Step S18 is YES, and the direction in which the motor is to be rotated has been judged to be forward when FoutL is zero, the difference between FinL and Fs is computed (Step S20). If the answer to Step S18 is YES, and the direction in which the motor is to be rotated has been judged to be the reverse direction when FoutR is zero, the difference between −FinR and Fs is computed, and if the answer to Step S18 is YES, and the direction in which the motor Is to be rotated has been judged to be the reverse direction when FoutL is zero, the difference between −FinL and Fs is computed also in Step S20. This computation is preparation for the computation of change amounts dFa-r and dFa-l.

Next, in order to read in the factor K, a judgment is made as to what manual-driving-force signal regions C1, C2 and C3 each of the current manual-driving-force representative signals FinR and FinL belongs to (Step S22). In the examples shown in FIGS. 7 and 8, a judgment is made as to which one of the regions C1, C2 and C3 each of FinR and FinL belongs to, by comparing it with the thresholds Fs−Fh and Fs+Fh. In case of FIG. 9, a judgment is made as to which one of the regions C4 through C8 each of FinR and FinL belongs to, by comparing it with the thresholds Fs−Fh2, Fs−Fh1, Fs+Fh1 and Fs+Fh2.

Figure 9:
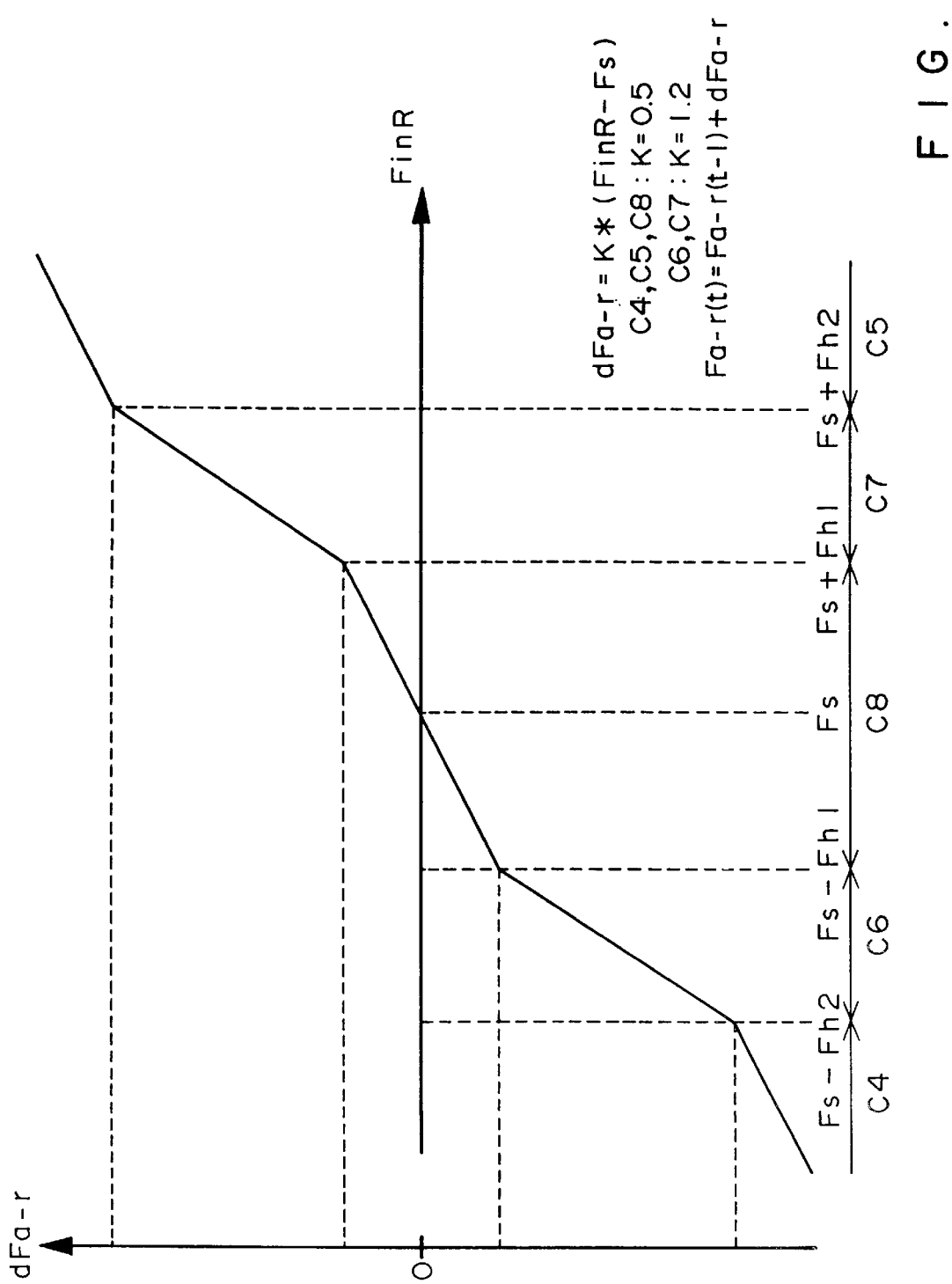
FIG. 9 shows a fourth example of the relationship between the manual-driving-force representative signal and the amount of change by which the preliminary motor driving signal is to be changed in the motor-driven vehicle shown in FIG. 2.

Alternatively, a judgment may be made as to whether each of (FinR−Fs) and (FinL−Fs) is smaller than −Fh, between −Fh and Fh inclusive, or larger than Fh, in the examples of FIGS. 7 and 8, or a judgment may be made as to whether each of (FinR−Fs) and (FinL−Fs) is smaller than −Fh2, not smaller than −Fh2 and smaller than −Fh1, between −Fh1 and Fh1 inclusive, larger than Fh1 and not larger than Fh2, or larger than Fh2, in the example shown In FIG. 9.

Once the region is determined, the factor K for that region is determined.

In the example shown in FIG. 6, the factor K is fixed, and, therefore, Step S22 is not executed. In the example of FIG. 10, the factor K is equal to the difference between FinR and Fs, multiplied by the constant A, or is equal to the difference between FinL and Fs, multiplied by the constant A. Accordingly, in place of determining the manual-driving-force signal region, the factor K may be computed in Step S22.

Next, from the difference as determined in Step S20 and the factor K as determined in Step S22, the motor-driving-signal change amounts dFa-r and dFa-l are computed by executing Steps S2 and S4 shown in FIG. 1 (Step S24).

Then, by executing Steps S6 and S8 (FIG. 1), the preliminary motor driving signals Fa-r(t) and Fa-l(t) are computed (Step S26).

If the answer to Step S18 is NO, Steps S20, S22 and S24 are skipped and Step S26 is executed. In this case, the preliminary motor driving signals Fa-r(t) and Fa-l(t) are equal to zero.

Next, the steps shown in the broken-line square S1(*a*) for computing the compensated motor driving signals are executed. Specifically, first a judgment is made as to whether the directions of rotation of the motors 12R and 12L are the same (Step S28). In other words, whether the actual motor driving signal FoutR and FoutL being provided are signals which tend to drive the vehicle straight or not is judged. Different directions of rotation of the motors 12R and 12L indicate that the actual motor driving signals FoutR and FoutL are such as to revolve or turn the vehicle. Accordingly, there is no need to compute compensated motor driving signals which would otherwise be required essentially for making it easier to drive the vehicle straight. Then, the new actual motor driving signals FoutR and FoutL to be applied to the drive units 22R and 22L, respectively, are computed, using the preliminary motor driving signals Fa-r(t) and Fa-l(t) as computed in Step S26 (Step S60).

If it is judged in Step S28 that the directions of rotation of the motors 12R and 12L are the same, the compensation factors are computed (Step S34). For example, the processing shown in FIG. 12 is executed. Referring to FIG. 12, first a judgment as to whether the polarities of the manual-driving-force representative signals FinR and FinL are the same is made (Step S340). If they are judged to be different, the ratio between the manual-driving-force representative signals cannot be made, and, therefore, the computation of the compensated motor driving signals is not carried out, and Step S60 is executed.

On the other hand, if the polarities of FinR and FinL are the same, FinR and FinL are compared with each other in order to determine the values of ar, al, br and bl (Step S341).

If it is judged that FinR≧FinL in Step S341, a compensation factor a is computed by the expression, FinR/(FinR+FinL), and a compensation factor b is computed by the expression, FinL/(FinR+FinL) (Step S342). Thus, the factors a and b are in such a relationship that a≧b. The factor a is used as the compensation factors ar and al, and the factor b is used as the compensation factors br and bl (Step S344).

If it is judged that FinL>FinR in Step S341, the factor a is computed by the expression, FinL/(FinR+FinL), and the factor b is computed by the expression, FinR/(FinR+FinL) (Step S343). Thus, the factor a is larger than the factor b, i.e. a>b. Then, Step S344 is executed to use a as ar and al, and to use b as br and bl.

Because the compensation factors ar, al, br and bl are computed from the manual-driving-force representative signals FinR and FinL, the compensation factors have values which approximate to each other when FinR and FinL have values approximating to each other, so that the vehicle can be driven straight with ease. When FinR and FinL have values relatively different from each other, the difference between of the value of ar and al and the value of br and bl is larger, so that the vehicle can be turned with ease.

When the factors ar, al, br and bl are determined, Step S10 and S12 (FIG. 1A) are executed, using the computed compensation factors ar, al, br and bl and the preliminary motor driving signals Fa-r(t) and Fa-l(t) computed in Step S26, to thereby determine the compensated motor driving signals Fa-rw(t) and Fa-lw(t), whereby new motor driving signals Fa-r(t) and Fa-l(t) are determined (Step S36). Next, Step S60 is executed to convert the motor driving signals Far(t) and Fa-l(t) into PWM signals for application to the drive units 22R and 22L.

Figure 13:
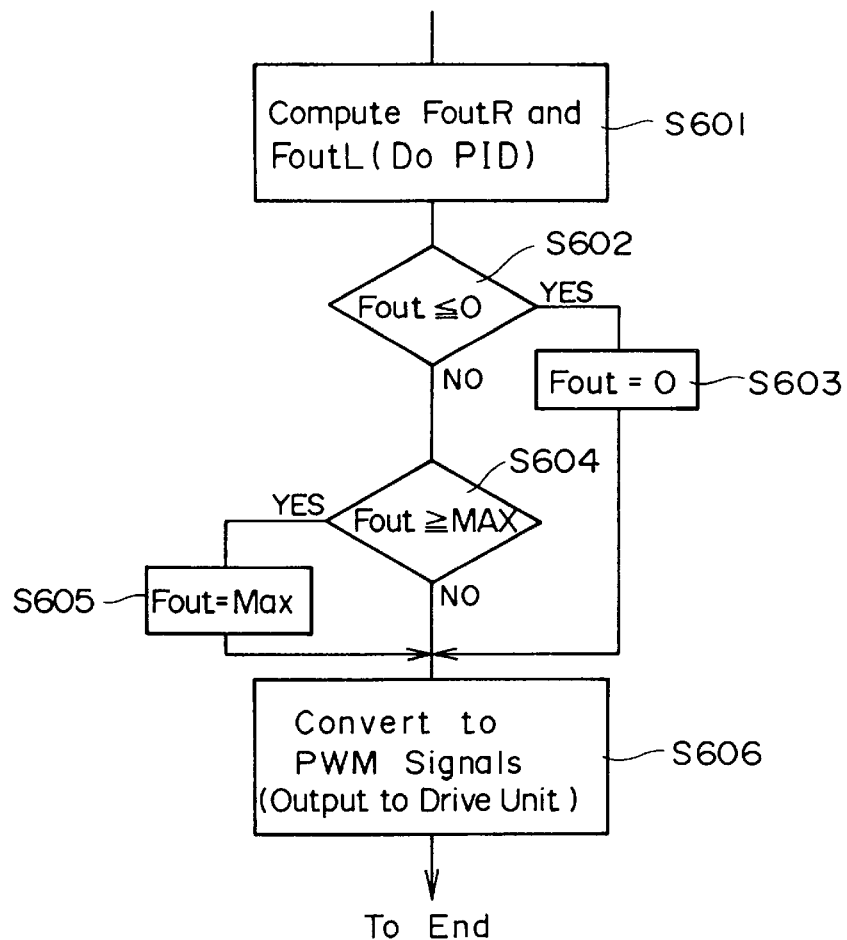
FIG. 13 is a flow chart showing how a PWM signal is provided to the driving unit of the motor-driven vehicle of FIG. 2.

The details of Step S60 are shown in FIG. 13. First, the motor driving signals Fa-r(t) and Fa-l(t) computed in Step S36 are subjected to PID operation to compute the actual motor driving signals FoutR and FoutL (Step S601). Then, a judgment is made as to whether FoutR and FoutL are zero or smaller. The actual motor driving signals equal to or smaller than zero are treated as zero (Step S603). Then, whether the actual motor driving signals which are greater than zero are equal to or greater than a predetermined maximum value MAX or not is judged (Step S604). The actual motor driving signals equal to or greater than MAX are treated as MAX (Step S605). The actual motor driving signals FoutR and FoutL determined in this way are converted into PWM signals having respective duty ratios depending on FoutR and FoutL (Step S606).

In the above-described example, the factors ar, al, br and bl are determined on the basis of the manual-driving-force representative signals FinR and FinL in accordance with the example shown in FIG. 12. However, the factors may be predetermined, or they can be freely changed as desired by each vehicle driver. In the latter case, an entry unit 31 may be provided for setting the factors ar, al, br and bl in the control unit 24, as shown in FIG. 4.

In the above-described example, the factors are computed when the directions of rotation of the motors are judged to be the same in Step S28. As shown in FIG. 14, however, Step S28 may be followed by Step S32 in which a judgment as to whether the difference between FinR and FinL is within a preset range or not is made. The difference within the preset range is judged to indicate that the vehicle is being driven straight. If the difference is outside the preset range, the vehicle is judged to be being turned or revolved.

When the vehicle is judged to be being driven straight, the compensated motor driving signals are computed in Step S36. If it is judged that the vehicle is being turned or revolved, the preliminary motor driving signals computed in Step S26 are converted into PWM signals in Step S60. In the example shown in FIG. 14, the preset factors ar, al, br and bl are used and, therefore, Step S34 is not used. However, Step S34 may be executed to determine the factors ar, al, br and bl according to the magnitudes of the manual driving forces.

In the above-described example shown in FIG. 11, the factors ar, al, br and bl are determined according to the ratio between the manual-driving-force representative signals FinR and FinL. However, the factors ar, al, br and bl can be determined according to respective values of the manual-driving-force representative signals FinR and FinL. For example, as shown in FIG. 7, the region in which FinR or FinL is smaller than Fs–Fh is referred to as an outer compensation region C1, the region between Fs–Fh and Fs is referred to as an adjacent compensation region C3–, which is adjacent to Fs, the region between Fs and Fs+Fh is referred to as an adjacent compensation regions C3+, which is adjacent to Fs, and the regions above Fs+Fh is referred to as an outer compensation region C2. Then, the control unit 24 is provided with a table shown in FIG. 15.

In FIG. 15, the compensation regions for FinR are shown in the uppermost row, and the compensation regions for FinL are shown in the leftmost column. In the block at the intersection of the column for a particular FinR and the row for a particular FinL, the compensation factors for the combination of the particular FinR and FinL are indicated. In each of the blocks, the ratio a: b (i.e. ar:br and al:bl) is shown above the broken line, and the respective compensation factors are indicated below the broken line.

In this table, all of the compensation factors ar, al, br and bl are set to 0.5 when the values of the right and left manual-driving-force representative signals FinR and FinL are substantially equal, i.e. when both FinR and FinL are in the outer region C1 or C2, or when both FinR and FinL are in the adjacent region C3+ or C3–. In such a case, because the right and left manual-driving-force representative signals are substantially equal, the vehicle 2 is judged to be being driven straight. Accordingly, the use of the same value for the respective compensation factors tends to make the compensated motor driving signals Fa-rw(t) and Fa-lw(t) substantially equal so that the vehicle can be driven straight with ease.

When the right and left manual driving forces differs little and their directions are the same; i.e. when FinR is in the region C3– and FinL is in the outer region C1, when FinR is in the outer region C1 and FinL is in the adjacent region C3–, when FinR is in the outer region C2 and FinL is in the adjacent region C3+, or when FinR is in the adjacent region C3+ and FinL is in the outer region C2, the compensation factors ar and al are set to 0.6 and the compensation factors br and bl are set to 0.4. In these cases, it is considered that the vehicle driver intends to drive the vehicle substantially straight, and, therefore, greater importance is attached to providing the facility of driving the vehicle straight by making the compensated motor driving signals Fa-rw(t) and Fa-lw(t) close to each other.

When the difference between the right and left manual driving forces is relatively large; e.g. when FinR is in the region C3− and FinL is in the outer region C2, or when FinR is in the outer region C2 and FinL is in the adjacent region C3−, the compensation factors ar and al are set to 0.8 and the compensation factors br and bl are set to 0.2. In such a case, due to FinR or FinL in the outer compensation region C2, the compensated motor driving signals Fa-rw(t) and Fa-lw(t) increase. Due to the increase of the compensated motor driving signals Fa-rw(t) and Fa-lw(t), FinR and FinL subsequently required can be reduced.

The difference between the right and left manual driving forces is relatively large also when FinR is in the adjacent compensation region C3+ and FinL is in the outer compensation region C1, or when FinL is in the adjacent region C3+ and FinR is in the outer region C1. In this case, the compensation factors ar and al are set to 0.6 and the compensation factors br and bl are set to zero (0). If the factors ar and al were set to 0.8 and the factors br and bl were set to 0.2, FinR or FinL in the outer compensation region would cause the compensated motor driving signals Fa-rw(t) and Fa-lw(t) to be reduced. With ar and al set to 0.6 and br and bl set to zero, the compensated motor driving signal associated with the adjacent compensation region C3+ is increased, while suppressing that compensated motor driving signal to the value of 0.6 times the corresponding one of FinR and FinL, to secure the right and left compensated motor driving forces.

When the difference between the right and left manual-driving-force representative signals is large; e.g. when FinR is in the outer compensation region C1 and FinL is in the outer compensation region C2, or when FinR is in the outer region C2 and FinL is in the outer region C1, the compensation factors ar and al are set to unity (1) and the compensation factors br and bl are set to zero (0). In this case, it is considered that the driver intends to keep the motors 12R and 12L rotating in the same direction and highly likely to revolve the vehicle body. Accordingly, the motor-driving-signal change amount dFa-r(t) itself is used as the compensated motor driving signal Fa-rw(t), or the motor-driving-signal change amount dFa-l(t) itself is used as the compensated motor driving signal Fa-lw(t). When the difference between the right and left manual-driving-force representative signals FinR and FinL is not so large; e.g. when FinR is in the adjacent compensation region C3+ and FinL is in the adjacent compensation region C3−, the compensation factor ar is set to unity (1), the factors br and al are set to zero (0) and the factor bl is set to 0.5. Similarly, when FinR is in the adjacent region C3− and FinL is in the adjacent region C3+, the factor ar is set to zero (0), the factor br to 0.5, the factor al to unity (1) and the factor bl to zero (0). In these cases, priority is given to the manual-driving-force representative signal falling in the adjacent region C3+, and, accordingly, both compensated motor driving signals Fa-rw(t) and Fa-lw(t) increase. For example, when the vehicle is manually started, so that both FoutR and FoutL are still zero (0), either one of the manual-driving-force representative signals may immediately enter into the adjacent compensation region C3+, which makes both compensated motor driving signals be simultaneously produced to thereby start the vehicle moving by the mechanical forces.

When the manual-driving-force representative signals are in the adjacent compensation regions C3+ and/or C3−, the compensation factors may be determined such that ar=br=al=bl=0.5.

As shown in FIG. 7, in the above-described examples, the manual-driving-force representative signal region C1 is coincident with the outer compensation region C1, the manual-driving-force representative signal region C2 is coincident with the outer compensation region C2, and the manual-driving-force representative signal region C3 is coincident with the combination of the adjacent compensation regions C3+ and C3−. However, the adjacent compensation regions and outer compensation regions may be set independent of the manual-driving-force representative signal regions.

Figure 16:
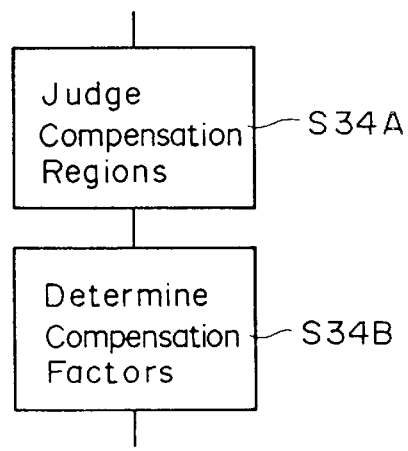
FIG. 16 is a flow chart showing another example of computation of the compensation factors of the motor-driven vehicle of FIG. 2.

Using the table described above, the compensation factor computation step S34 may be executed in the manner shown in FIG. 16. First, a judgment is made as to in which one of the compensation regions shown in FIG. 7 each of the manual-driving-force representative signals FinR and FinL lie (Step S34A). The regions to which FinR and FinL belong are applied to the table shown in FIG. 15 to determine the respective compensation factors (Step S34B). For example, when FinR and FinL are in the compensation regions C3+ and C2, respectively, ar, br, al and bl are 0.6, 0.4, 0.6 and 0.4, respectively.

The table shown in FIG. 15 is for four compensation regions, but a larger number of narrower compensation regions may be defined.

Furthermore, if the left manual-driving-force representative signal FinL tends to be smaller than the right manual-driving-force representative signal FinR, i.e. if the manual driving force given by the left arm of the vehicle driver is smaller than the manual driving force given by the right arm, the table may be modified such that the compensation factors ar=al=1, br=0, and bl=0.5 so as to compensate the left manual driving force. On the other hand, if the right manual-driving-force representative signal FinR is smaller than the left manual-driving-force representative signal FinL, i.e. if the manual driving force given by the right arm of the vehicle driver is smaller than the manual driving force given by the left arm, the table may be modified such that the compensation factors ar=al=1, br=0.5, and bl=0 so as to compensate the right manual driving force.

In the above-described examples, the mechanical driving forces are compensated. However, the motor-driving-signal change amounts dFa-r and dFa-l may be compensated instead. In brief, referring to FIGURE 1B, first the motor-driving-signal change amounts dFa-r and dFa-l are determined (Steps S40 and S42). The compensated change amount dFa-rw for the motor 12R is computed, with dFa-l taken into account (Step S44). For example, in Step S44, the compensated change amount dFa-rw is determined by ar·dFa-r+br·dFa-l. Similarly, in Step S46, the compensated change amount dFa-lw for the motor 12L is computed by al·dFa-l+bl·dFa-r. The compensation factors ar, br, al and ar are the same as those used in the previously described examples. By the use of compensated change amounts, the difference in mechanical driving forces due to the difference in manual driving forces can be retained, which is advantageous when the vehicle is driven straight across a slope.

The computed compensated change amount dFa-rw is added to the current preliminary motor driving signal Fa-r(t−1) for the motor 12R, which results in a new preliminary motor driving signal Fa-r(t) for the motor 12R (Step S48). Similarly, the computed compensated change amount dFa-lw is added to the current preliminary motor driving signal Fa-l(t−1) for the motor 12L so that a new preliminary motor driving signal Fa-l(t) for the motor 12L is produced (Step S50).

Figure 17:
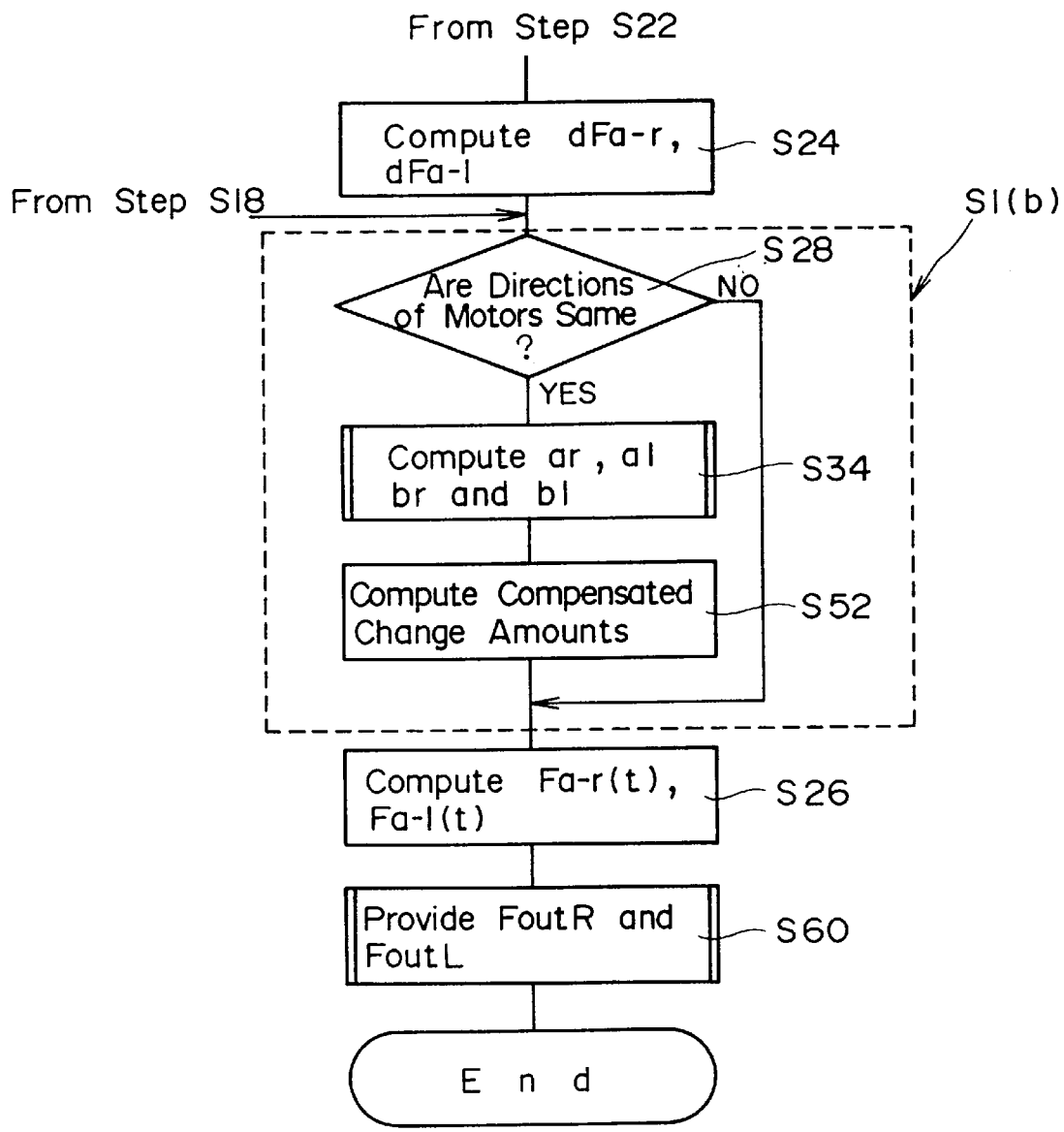
FIG. 17 is a flow chart of part of the operation of the control unit of a second modification of the motor-driven vehicle shown in FIG. 2.

A broken line box S1(b) shown in FIG. 17 is a flow chart for computing compensated motor-driving-signal change amounts. Prior to this processing, the same processing executed in Steps S14 through S24 shown in FIG. 11 are executed, but Steps S14 through S22 are not shown in FIG.

17 for simplifying the illustration. In the processing shown in FIG. 11, Step 26 for computing preliminary motor driving signals is executed after Step S24, but, in the processing shown in FIG. 17, a judgment as to in which directions the motors are rotating is made in Step S28 in the section S1(b). After that, Step S34 is executed for computing the compensation factors. The compensation factors may be computed on the basis of the ratio between FinR and FinL as shown in FIG. 12, or may be computed using the table shown in FIG. 15 and the processing shown in FIG. 16. Next, processing similar to Steps S44 and S46 shown in FIG. 1B are executed to compute the compensated change amounts dFa-rw and dFa-lw (Step S52). After that, processings similar to Steps S48 and S50 shown in FIGURE 1B are executed for computing the preliminary motor driving signals Fa-r(t) and Fa-l(t) (Step S26). In Step S60, the actual motor driving signals FoutR and FoutL are computed from the preliminary motor driving signals Fa-r(t) and Fa-l(t), and the actual motor driving signals FoutR and FoutL are converted into PWM signals for application to the drive units 16R and 16L.

If the answer to Step S28 is NO, the change amounts dFa-r and dFa-l computed in Step S24 are used in Step S26 for computation of the preliminary motor driving signals Fa-r(t) and Fa-l(t).

In this example, too, the compensation factors ar, br, al and bl can be set to any desired values through the entry unit 31 (FIG. 4). Furthermore, as in the previously described examples, Step S32 for judging whether the difference between the right and left manual driving forces is within a predetermined range or not may follow Step S28, as shown in FIG. 18. Step S34 is not included in the processing shown in FIG. 18, but it may be included.

The basic concept of the illustrated embodiment thus far described is to add the amount of change in manual driving force to a current mechanical driving force to produce a new mechanical driving force. However, the manual-driving-force representative signals FinR and FinL may be multiplied by a given factor for use as the preliminary motor driving signals Fa-r(t) and Fa-l(t). In this case, the compensated motor driving signals Fa-rw(t) and Fa-lw(t) are computed by the expressions, ar·Fa-r(t)+br·Fa-l(t) and al·Fal(t)+bl·Fa-r(t), respectively.

What is claimed is:

1. A motor-driven vehicle comprising:

a vehicle body;

first and second drive wheels mounted on opposite sides of said body;

first and second motors driving said first and second drive wheels, respectively;

first manual-driving-force sensing means for sensing a first manual driving force applied to rotate said first drive wheel and developing a first manual-driving-force representative signal representing the sensed first manual driving force;

second manual-driving-force sensing means for sensing a second manual driving force applied to rotate said second drive wheel and developing a second manual-driving-force representative signal representing the sensed second manual driving force; and control means for computing, at each of a plurality of sampling times occurring at predetermined intervals, first and second preliminary motor driving signals which, if applied to said first and second motors, would make said first and second motors provide first and second mechanical driving forces, respectively, said first preliminary motor driving signal being computed by adding to said first preliminary motor driving signal computed at a preceding sampling time, a value of a predetermined function with an argument which is the difference between said first manual-driving-force representative signal as sampled at each sampling time and a predetermined reference value, said second preliminary motor driving signal being computed by adding to said second preliminary motor driving signal computed at a preceding sampling time, a value of the predetermined function with an argument which is the difference between said second manual-driving-force representative signal as sampled at each sampling time and a predetermined reference value;

wherein said control means includes compensated mechanical driving force computing means for computing, according to said first and second preliminary motor driving signals, first and second compensated motor driving signals to be applied to said first and second motors, respectively;

said first compensated motor driving signal being the sum of said first and second preliminary motor driving signals multiplied by first and second compensation factors, respectively;

said second compensated motor driving signal being the sum of said second and first preliminary motor driving signals multiplied by third and fourth compensation factors, respectively, which are set independently of said first and second compensation factors.

2. The motor-driven vehicle according to claim 1 wherein said control means includes means for activating said compensated mechanical driving force computing means when the directions of rotation of said first and second motors are judged to be same.

3. The motor-driven vehicle according to claim 2 wherein said control means includes a compensation table for setting a number of thresholds for said first and second manual-driving-force representative signals to thereby define a plurality of compensation regions bounded by said thresholds, said compensation table being used to determine the respective compensation factors according to a combination of particular compensation regions in which said first and second manual-driving-force representative signals fall.

4. The motor-driven vehicle according to claim 3 wherein said compensation factors have values which are between zero (0) and unity (1) both inclusive.

5. The motor-driven vehicle according to claim 4 wherein said compensation table is such that as the difference between the compensation regions in which said first and second manual-driving-force representative signals fall is greater, said first compensation factor is greater than said second compensation factor and said third compensation factor is greater than said fourth compensation factor are greater.

6. The motor-driven vehicle according to claim 4 wherein said compensation table is such that said first, second, third and fourth compensation factors have the same value when said first and second manual-driving-force representative signals fall in the same compensation regions.

7. A motor-driven vehicle comprising:

a vehicle body;

first and second drive wheels mounted on opposite sides of said body;

first and second motors driving said first and second drive wheels, respectively;

first manual-driving-force sensing means for sensing a first manual driving force applied to rotate said first drive wheel and developing a first manual-driving-force representative signal representing the sensed first manual driving force;

second manual-driving-force sensing means for sensing a second manual driving force applied to rotate said second drive wheel and developing a second manual-driving-force representative signal representing the sensed second manual driving force; and control means for computing, at each of a plurality of sampling times occurring at predetermined intervals, first and second preliminary motor driving signals which, if applied to said first and second motors, would make said first and second motors provide first and second mechanical driving forces, respectively, said first preliminary motor driving signal being computed by adding to said first preliminary motor driving signal computed at a preceding sampling time, a value resulting from multiplying the difference between said first manual-driving-force representative signal as sampled at each sampling time and a predetermined reference value by a factor, said second preliminary motor driving signal being computed by adding to said second preliminary motor driving signal computed at a preceding sampling time, a value resulting from multiplying the difference between said second manual-driving-force representative signal as sampled at each sampling time and a predetermined reference value by a factor;

wherein said control means includes compensated mechanical driving force computing means for computing, according to said first and second preliminary motor driving signals, first and second compensated motor driving signals to be applied to said first and second motors, respectively;

said first compensated motor driving signal being prepared from said first preliminary motor driving signal with said second preliminary motor driving signal taken into account;

said second compensated motor driving signal being prepared from said second preliminary motor driving signal with said first preliminary motor driving signal taken into account.

8. A motor-driven vehicle comprising:

a vehicle body;

first and second drive wheels mounted on opposite sides of said body;

first and second motors driving said first and second drive wheels, respectively;

first manual-driving-force sensing means for sensing a first manual driving force applied to rotate said first drive wheel and developing a first manual-driving-force representative signal representing the sensed first manual driving force;

second manual-driving-force sensing means for sensing a second manual driving force applied to rotate said second drive wheel and developing a second manual-driving-force representative signal representing the sensed second manual driving force; and control means for computing at each of a plurality of sampling times occurring at predetermined intervals, first and second motor driving signals which, when applied to said first and second motors, make said first and second motors provide first and second mechanical driving forces, respectively;

said first motor driving signal being prepared from the first motor driving signal applied to said first motor at a preceding sampling time, with a first compensated amount of change taken into account;

said second motor driving signal being prepared from the second motor driving signal applied to said second motor at a preceding sampling time, with a second compensated amount of change taken into account;

said first compensated amount of change being prepared from a first amount of change for said first motor driving signal which is related to the difference between said first manual-driving force representative signal as sampled at each sampling time and a reference value;

said second compensated amount of change being prepared from a second amount of change for said second motor driving signal which is related to the difference between said second manual-driving force representative signal as sampled at each sampling time and said reference value;

said first compensated amount of change being the sum of said first amount of change and said second amount of change multiplied by first and second compensation factors, respectively;

said second compensated amount of change being the sum of said second amount of change and said first amount of change multiplied by third and fourth compensation factors, respectively, which are set independently of said first and second compensation factors.

9. The motor-driven vehicle according to claim 8 wherein said control means computes said first and second compensated amounts of change when the directions of rotation of said first and second motors are judged to be same.

10. The motor-driven vehicle according to claim 9 wherein said first compensation factor has a value equal to or greater than that of said second compensation factor, and said third compensation factor has a value equal to or greater than that of said fourth compensation factor.

11. The motor-driven vehicle according to claim 10 wherein the sum of the values of said first and second compensation factors is equal to the sum of the values of said third and fourth compensation factors.

12. The motor-driven vehicle according to claim 11 wherein said first compensation factor has a value equal to the value of said third compensation factor, and said second compensation factor has a value equal to the value of said fourth compensation factor.

13. The motor-driven vehicle according to claim 11 wherein said control means includes compensation factor computing means which computes said first, second, third and fourth compensation factors, according to the ratio between said first and second manual-driving-force representative signals.

14. The motor-driven vehicle according to claim 11 wherein said control means computes said first and second compensated amounts of change when the difference between said first and second manual-driving-signal representative signals is within a preset range.

15. The motor-driven vehicle according to claim 10 wherein there is provided entry means for setting said first, second, third and fourth compensation factors in said control means.

16. The motor-driven vehicle according to claim 9 wherein said control means includes a compensation table for setting a number of thresholds for said first and second manual-driving-force representative signals to thereby define a plurality of compensation regions bounded by said thresholds, said compensation table being used to determine the respective compensation factors according to a combination of particular compensation regions in which said first and second manual-driving-force representative signals fall.

17. The motor-driven vehicle according to claim 16 wherein said compensation factors have values which are between zero (0) and unity (1) both inclusive.

18. The motor-driven vehicle according to claim 17 wherein said compensation table is such that as the difference between the compensation regions in which said first and second manual-driving-force representative signals fall is greater, said first compensation factor is greater than said second compensation factor and said third compensation factor is greater than said fourth compensation factor are greater.

19. The motor-driven vehicle according to claim 17 wherein said compensation table is such that said first, second, third and fourth compensation factors have the same value when said first and second manual-driving-force representative signals fall in the same compensation regions.

20. The motor-driven vehicle according to claim 17 wherein said compensation regions comprise two adjacent compensation regions on opposite sides of a threshold which is a reference value for said first and second manual-driving-force representative signals, and a plurality of outer compensation regions disposed outward of respective ones of said two adjacent compensation regions; and said compensation table is such that when one of said first and second manual-driving-force representative signals falls in one of said two adjacent compensation regions and the other of said first and second manual-driving-force representative signals falls in the other of said two adjacent compensation regions, the values of said first and fourth compensation factors are zero and the values of said second and third compensation factors are greater than zero, or the values of said second and third compensation factors are zero and the values of said first and fourth compensation factors are greater than zero.

21. The motor-driven vehicle according to claim 20 wherein said compensation table is arranged such that the values of said first and fourth compensation factors are zero when said first manual-driving-force representative signal falls in the adjacent compensation region below said reference value, and the values of said second and third compensation factors are zero when said second manual-driving-force representative signal falls in the adjacent compensation region below said reference value.

22. The motor-driven vehicle according to claim 21 wherein said compensation table is arranged such that the values of said first and fourth compensation factors are greater than zero with the value of said first compensation factor being larger than the value of said fourth compensation factor when said first manual-driving-force representative signal falls in the adjacent compensation region above said reference value, and that the values of said second and third compensation factors are greater than zero with the value of said third compensation factor being larger than the value of said second compensation factor when said second manual-driving-force representative signal falls in the adjacent compensation region above said reference value.

23. A motor-driven vehicle comprising: a vehicle body;
first and second drive wheels mounted on opposite sides of said body;
first and second motors driving said first and second drive wheels, respectively;
first manual-driving-force sensing means for sensing a first manual driving force applied to rotate said first drive wheel and developing a first manual-driving-force representative signal representing the sensed first manual driving force;
second manual-driving-force sensing means for sensing a second manual driving force applied to rotate said second drive wheel and developing a second manual-driving-force representative signal representing the sensed second manual driving force; and
control means for computing, according to said first and second manual-driving-force representative signals, first and second preliminary motor driving signals which, if applied to said first and second motors, would make said first and second motors provide first and second mechanical driving forces, respectively;
said control means including compensated mechanical driving force computing means for computing, according to said first and second preliminary motor driving signals, first and second compensated motor driving signals to be applied to said first and second motors, respectively;
said first compensated motor driving signal being the sum of said first and second preliminary motor driving signals multiplied by first and second compensation factors, respectively;
said second compensated motor driving signal being the sum of said second and first preliminary motor driving signals multiplied by third and fourth compensation factors, respectively, which are set independently of said first and second compensation factors;
said control means further including means for activating said compensated mechanical driving force computing means when the directions of rotation of said first and second motors are judged to be same;
said first compensation factor having a value equal to or greater than that of said second compensation factor, said third compensation factor having a value equal to or greater than that of said fourth compensation factor.

24. The motor-driven vehicle according to claim 23 wherein the sum of the values of said first and second compensation factors is equal to the sum of the values of said third and fourth compensation factors.

25. The motor-driven vehicle according to claim 24 wherein the value of said first compensation factor is equal to the value of said third compensation factor, and the value of said second compensation factor is equal to the value of said fourth compensation factor.

26. The motor-driven vehicle according to claim 24 wherein there is provided compensation factor computing means which computes said first, second, third and fourth compensation factors, according to the ratio between said first and second manual-driving-force representative signals.

27. The motor-driven vehicle according to claim 24 wherein said compensated mechanical driving force computing means computes said first and second compensated motor driving signals when the difference between said first and second manual-driving-signal representative signals is within a preset range.

28. The motor-driven vehicle according to claim 23 wherein there is provided entry means for setting said first, second, third and fourth compensation factors in said compensated mechanical driving force computing means.

* * * * *